United States Patent
Ono et al.

(10) Patent No.: US 7,218,834 B2
(45) Date of Patent: May 15, 2007

(54) METHOD AND APPARATUS FOR RECORDING AND PLAYING BACK MONITORED VIDEO DATA

(75) Inventors: Koichi Ono, Yokosuka (JP); Takayuki Kanesaki, Hitachinaka (JP); Hideo Nishijima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1093 days.

(21) Appl. No.: 09/978,059

(22) Filed: Oct. 17, 2001

(65) Prior Publication Data

US 2002/0041755 A1    Apr. 11, 2002

Related U.S. Application Data

(63) Continuation of application No. 09/780,429, filed on Feb. 12, 2001, now Pat. No. 6,684,024, which is a continuation of application No. 09/015,344, filed on Jan. 29, 1998, now abandoned.

(30) Foreign Application Priority Data

Jan. 29, 1997  (JP) .............................. P09-015190

(51) Int. Cl.
  *H04N 7/00*   (2006.01)
  *H04N 5/86*   (2006.01)

(52) U.S. Cl. .......................... 386/46; 360/15

(58) Field of Classification Search ............... 386/68, 386/125, 124, 46, 45, 109, 111, 112, 52, 4; 368/15
See application file for complete search history.

(56) References Cited

U.S. PATENT DOCUMENTS 5,153,730 A * 10/1992 Nagasaki et al. ......... 348/231.6

FOREIGN PATENT DOCUMENTS

JP    H3-088486    4/1991
WO    WO 96/33579  10/1996

OTHER PUBLICATIONS

Japanese Office Action and translation thereof.

* cited by examiner

*Primary Examiner*—Robert Chevalier
(74) *Attorney, Agent, or Firm*—Crowell & Moring LLP

(57) ABSTRACT

A method and an apparatus for recording and playing back monitored video data for recording monitored video data generated continuously for a long time on a magnetic tape, with less S/N degradation by shortening the operation time of the VTR to suppress the degradation of the magnetic tape, recording head, and other mechanical items, wherein video signals from a video camera are converted to digital signals in an A/D converter, compressed and encoded in a compression encoder & decoder circuit, then transferred to a time axis compression circuit including the first memory, the second memory, an SCSI controller, and a hard disk unit, thereafter compressed on the time axis and recorded on the magnetic tape loaded in a D-VHS standard VTR via an I/F circuit. Compressing the video data from the compression encoder & decoder circuit on the time axis in the time axis compression circuit makes shorter the recording time of the video data on the magnetic tape than the actual recording time of the video camera, whereby the VTR is only required to record video data intermittently on the magnetic tape and that a general home VTR can be adopted as the above VTR, moreover the magnetic tape itself is prevented from damages.

2 Claims, 14 Drawing Sheets

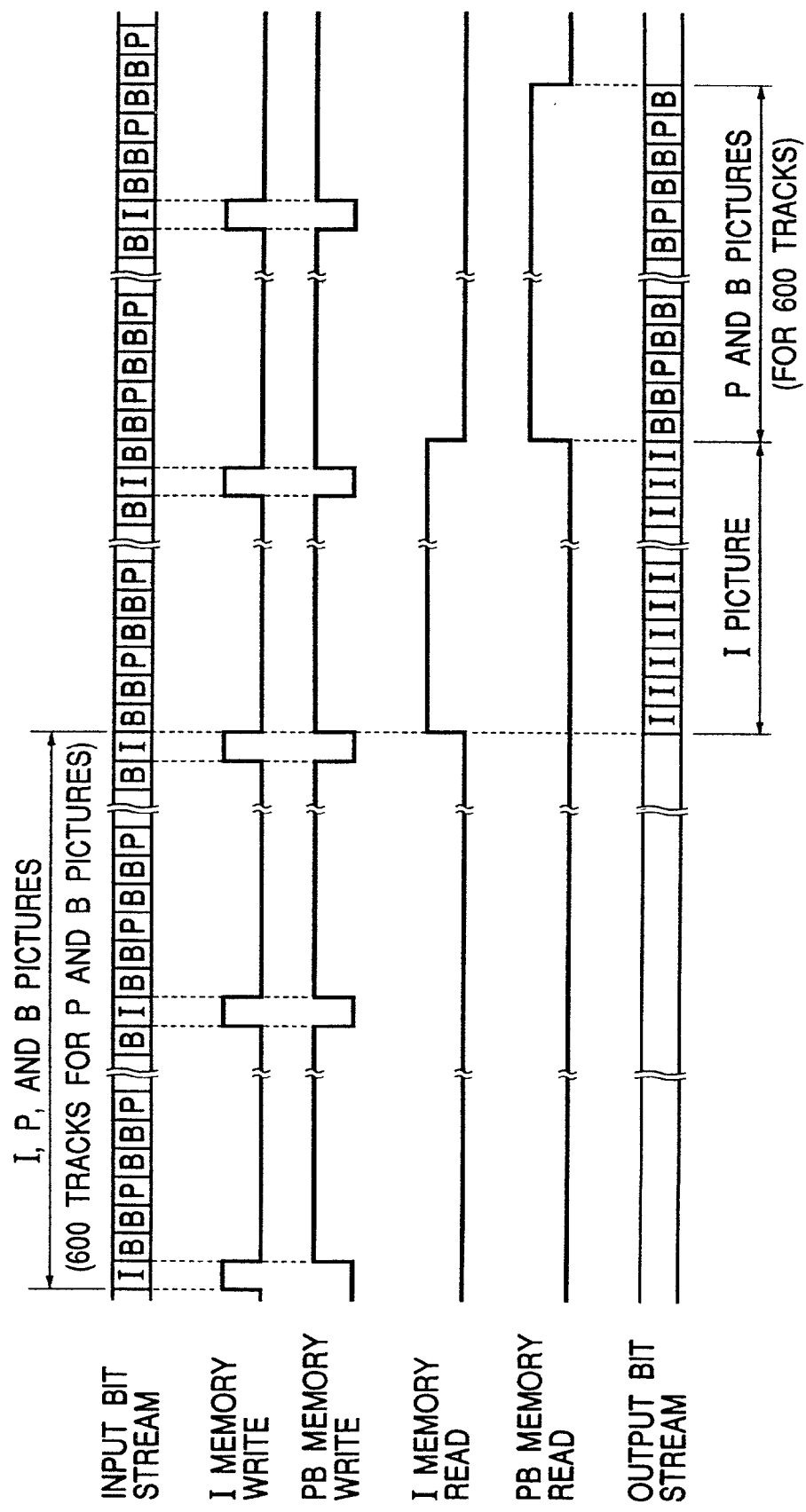

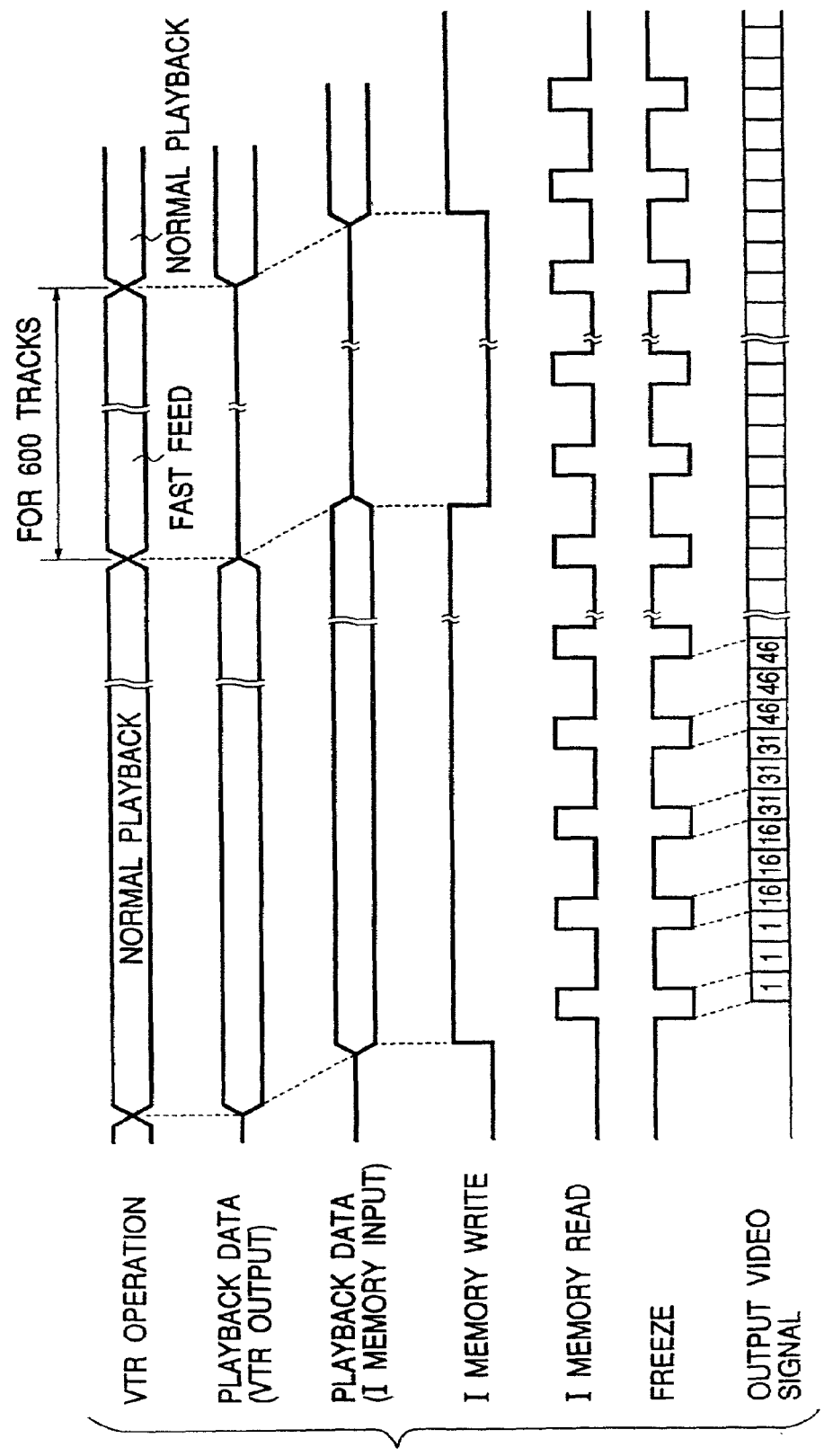

METHOD AND APPARATUS FOR RECORDING AND PLAYING BACK MONITORED VIDEO DATA

This application is a continuation of application Ser. No. 09/780,429, filed Feb. 12, 2001, now issued as U.S. Pat. No. 6,684,024, which is a continuation of application Ser. No. 09/015,344, filed Jan. 29, 1998, now abandoned. Each application claims the priority of Japanese application Number 9-015190, the disclosure of which is expressly incorporated by reference herein.

BACKGROUND OF THE INVENTION

The present invention relates to methods and apparatuses for recording and playing back video data, more particularly to a method and an apparatus for recording and playing back monitored video data, which will be suitable for recording video data for a long time for the purpose of monitoring and preventing of crimes.

There is provided a prior art time lapse VTR used as a video data recording device for recording video data from a video camera, suitable for monitoring and preventing crimes. Many of this type VTR are improved from a home VHS VTR which is very popular at present to enable a long time recording. For example, in such a time lapse VTR, the magnetic tape can be fed at a ⅓ speed of the VHS Extended Play (EP) mode to record only one of the input video 3 fields on the tape, so that the recording time can be extended to 3 times that of the EP mode. Consequently, when a 120-min tape is used, the recording time is extended to 6 hours (120 min×3) in the VHS EP mode. The recording time of the above time lapse VTR can thus be extended to 18 hours, 3 times that of the VHS EP mode. In this case, however, as understood clearly from the recording principle explained above, the number of fields per second is 20, which is ⅓ of the VHS (60 fields). In addition, audio signals can be recorded on audio tracks arranged in the longitudinal direction of the tape just like an ordinary VTR, but the tape speed becomes ⅓ of the normal one. As a result, the sound quality is degraded more than the normal one. In spite of this, the time lapse VTR can have an advantage of 18-hour audio recording time.

There is also proposed an intermittent recording system for the above prior art time lapse VTR, in which system, the average tape speed is delayed and the number of recording fields is reduced more to extend the recording time. This system can have the maximum recording time of, for example 720 hours using a normal 120-min tape by, recording video data at a rate of 1 field per 2 seconds (120 fields) per frame (2 hours×3 times×120=720 hours). In such a super-long time recording operation, the average tape feed speed is very slow, so that it becomes difficult to control the continuous feeding of the tape. To avoid this problem, the tape is fed intermittently in most cases and accordingly, it becomes impossible to record audio signals in audio tracks.

The conventional time lapse VTR ware opened in, for example, Examined Published Japanese Patent Application No.3-12380, Examined Published Japanese Patent Application No.7-63182, etc. The former patent report describes a method for controlling tape feeding so as to obtain the same recording tape pattern as that of the ordinary VTR even at the recording time by feeding the tape intermittently just like in the above-mentioned 720-hour recording. The latter patent report (No.7-63182) describes a method for controlling the rotation speed of the cylinder to prevent generation of skew during the intermittent recording.

As explained above, the time lapse VTR needs recording modes for continuous low speed tape feeding and intermittent tape feeding in addition to the normal continuous tape feeding, and a means for precision controlling of the capstan and the cylinder corresponding to those playback modes. In a recording operation, the same playback mode as each of those recording modes is needed to check pictures at the same speed as that of the recording. For this purpose, each of those prior art VTRs must be provided with various precision control means, so their prices become more higher than general home VTRs.

The time lapse art VTR cannot load (wind a magnetic tape onto the cylinder to which a magnetic head is attached to prepare for recording or playing back) a magnetic tape (video data recording medium) and unload (separate the tape from the cylinder) the magnetic tape within a short time even for a recording operation in a recording mode for intermittent tape feeding. Therefore, the tape is needed to be kept loaded during recording. Further, since the cylinder has a large moment and takes much time until its rotation speed is stabilized, the cylinder must be rotated almost at a fixed speed continuously during the recording.

Therefore, the time lapse VTR must be kept loaded with a tape during recording of monitored video data and the cylinder is rotated continuously. Especially, in the above super-long recording mode (720-hour mode), the VTR has a disadvantage that because the cylinder is kept rotated in contact with the tape for 720 hours, the tape is damaged far more rapidly than used for a home VTR. In the same way, because the head is in contact with the tape, the head is also worn rapidly. The mechanisms such as the motor and belt used for making the cylinder rotate are also degraded rapidly and often damaged, since they are running for a long time respectively.

Further, conventional helical scanning VTR also has a following defect; the recording track pattern angle on the tape loaded is decided by both the rotation speed of the cylinder and the feed speed of the tape, so that the track pattern recorded at the above slow speed tape feeding or the tape stops has an angle different from the normal speed tape feeding. Therefore, when playing back the track pattern recorded in such way, a mismatching occurs between the tracing angle of the head and the angle of the track pattern, causing the SIN (signal-noise ratio) to be degraded in a part of the playback signals, with the resultant of lowering the quality of output pictures significantly.

SUMMARY OF THE INVENTION

It is an object of the present invention to provide a method and an apparatus for recording and playing back monitored video data, which can store video data on a magnetic tape for a period enough to be used for monitoring and preventing crimes, etc. In addition, in the apparatus, it is no need to record video data while the recording head is put in contact with the magnetic tape for a long time and while the recording head is moved, without special mechanisms for intermittent feeding, etc. In other words, a general home VTR can also be used to store video data on a magnetic tape for a period enough to monitor and prevent crimes, etc.

It is another object of the present invention to solve the above-mentioned problems of conventional time lapse VTR and provide an apparatus for recording and playing back video data, which can improve its mechanical reliability and extend the life of the magnetic tape in use by reducing the operating time of the parts that will apt to wear and be damaged, without employing any high precision control means for intermittent tape feeding.

It is a further object of the present invention to provide an apparatus for recording and playing back video data, which can output good quality playback images without degrading the playback signals even in a different tape-speed mode from the recording mode.

In order to achieve the above objects, according to the present invention, video data compressed on the time axis is stored on a magnetic tape, so that when video signals from a monitoring video camera are to be stored on the magnetic tape continuously for a long time, the magnetic tape recording apparatus is operated for a period shorter than the monitoring period. Thus, it is not required to operate the magnetic tape recording device (VTR) continuously during the monitoring.

In other words, the present invention provides a method for recording and playing back monitored video data for storing video signals generated continuously for a long time, on a magnetic tape, wherein while continuously generating video signals for a long time and entering such video signals and compressing it on the time axis, then being output as digital video data and recorded on a magnetic tape, so that the digital video signals are stored on the magnetic tape for a period shorter than the period in which the video signals are generated continuously.

Furthermore, the present invention provides an apparatus for recording and playing back monitored video data and storing video signals generated continuously for a long time on a magnetic tape, comprising a means of generating video signals continuously for a long time; a means of entering video signals generated by the video signal generating means continuously for a long time and compressing the video signals on the time axis so as to be output as digital signal video data; and a means of recording and playing back digital video data from the time axis compressing means on a magnetic tape, wherein the period in which the magnetic tape recording means records digital video data on the magnetic tape is shorter than the period in which the video signal generating means generates video signals continuously.

In order to achieve the above objects, the monitored data recording & playback apparatus provided by the present invention for recording video information for a long time, comprises the first memory means of storing video data temporarily; the first recording & playback means of recording the data output from the first memory means on a recording medium; the second memory means of storing playback data from the first recording & playback means temporarily; the second recording & playback means of recording data output from the second memory means on a magnetic tape by forming oblique tracks on the magnetic tape; and a control means of controlling the write and read operations of the first and second means and recording and playback operations of the first and second recording & playback means. The control means controls so that reading from the first memory means and recording by the first recording & playback means are repeated each time the first specified data amount is reached, as well as controls the first recording & playback means and the second recording & playback means in the first operation mode so that they stop recording and playback operations respectively until the data recorded in the first recording & playback means and not played back yet reaches the second specified data amount, which is greater than the first specified data amount. In addition, the control means controls the first and second recording & playback means so that when the data recorded and not played back yet reaches the second specified data amount, the first recording & playback means time-shares recording and playback of data until the data of the second specified data amount is played back completely. And furthermore, the control means controls so that the second recording & playback means records the data read by the second memory means at a specified transfer rate on a magnetic tape fed continuously while forming oblique tracks on the tape and feeding the tape continuously.

Furthermore, in order to achieve the above objects, the recording & playback apparatus provided by the present invention comprises: the first memory means of storing video data temporarily; the first and second recording & playback means of recording the data output from the first memory means on a recording medium; the second memory means of storing playback data from the first and second recording & playback means; the third recording & playback means of recording the data output from the second memory means on a magnetic tape by forming oblique tracks on the tape; and a control means of controlling write and read operations of the first and second memory means and recording and playback operations of the first, second, and third recording & playback means, so that when in recording of video data, the control means controls so that four operation modes are changed appropriately as follows according to the data amount to read and the data amount to play back in the first and second recording & playback means; in the first operation mode, the control means controls so that reading of video data from the first memory means and recording by the first recording & playback means are repeated each time the first specified data amount is reached and recording and playback operations of the second and third recording & playback means are stopped. In the second operation mode, the control means controls so that reading of video data from the first memory means and recording by the second recording & playback means are repeated each time the first specifier data amount is reached and the video data read from the first recording & playback means is stored in the second memory means temporarily, and then video data is read from the second memory means at a specified transfer rate while the third recording & playback means is enabled to record transferred data on the magnetic tape by forming oblique tracks on the tape. In the third operation mode, the control means controls so that reading of video data from the first memory means and recording by the second recording & playback means are repeated each time the first specified data amount is reached while recording and playback operations of the first and third recording & playback means are stopped. And, in the fourth operation mode, the control means controls so that reading of video data from the first memory means and recording by the first recording & playback means are repeated each time the first specified data amount is reached, and video data read from the second recording & playback means is stored in the second memory means temporarily, and then video data is read from the second memory means at a specified transfer rate while the third recording & playback means is enabled to record transferred data on the magnetic tape fed continuously by forming oblique tracks on the tape.

Furthermore, in order to achieve the above objects, the monitored video data recording & playback apparatus provided by the present invention, which records compressed and encoded video data on a magnetic tape by forming oblique tracks on the tape, is further provided with a means of changing the time order of video data when in a recording operation so that only the first group video data selected from the above video data and compressed and encoded in the m (m=an integer of 2 or over) frame time interval is continued by n (n=an integer of 2 or over) frames; a means of restoring the initial video data time orders of the first group video data and other video data; a means of controlling so as to play back only the first group video data selectively and feed other data fast; and a memory means of storing the played-back first group video data temporarily.

BRIEF DESCRIPTION OF THE DRAWINGS

FIG. 13 is a timing chart indicating the operation of the data order change circuit used in the monitored video data recording & playback apparatus shown in FIG. 11.

FIG. 14 is a timing chart indicating the operation of the monitored video data recording & playback apparatus in the fourth embodiment of the present invention shown in FIG. 11.

DESCRIPTION OF THE PREFERRED EMBODIMENTS

Hereunder, the preferred embodiments of the present invention will be explained with reference to the attached drawings.

Figure 1:
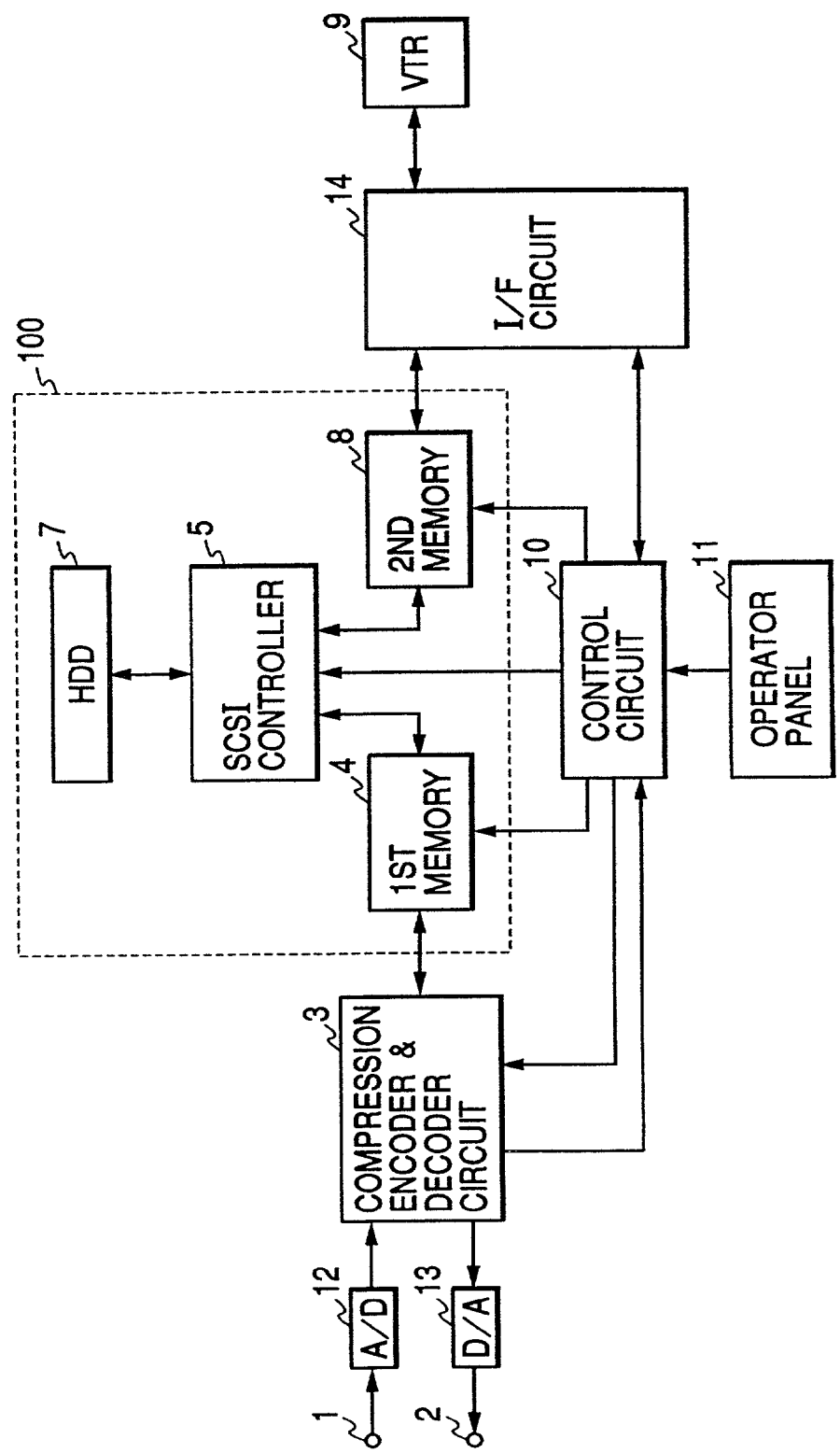
FIG. 1 is a block diagram of the monitored video data recording & playback apparatus in the first embodiment o the present invention.

FIG. 1 is a block diagram of the recording & playback apparatus for monitored video data in the first embodiment of the present invention. In FIG. 1, numeral 1 indicates a terminal to input video signals from a video camera (not illustrated), 2 indicates a terminal to output video signals, 3 indicates a compression encoder & decoder circuit, 4 and 8 indicate semiconductor memories (4: the first memory, 8: the second memory), 5 indicates an SCSI (Small Computer System Interface) controller, 7 indicates a hard disk unit (hereafter, to be abbreviated as HDD) provided with an SCSI interface, 9 indicates a VTR, 10 indicates a control circuit, 11 indicates an operator panel from which the operator instructs various operations, 12 indicates an A/D converter, 13 indicates a D/A converter, and 14 indicates an IEEE1394 interface circuit (hereafter, to be abbreviated as I/F circuit). Of those devices, the semiconductor memories (the first and second memories 4 and 8), the SCSI controller 5, the HDD 7 are combined to form a time axis compression circuit 100 for compressing video data to record on the time axis. Each of those devices forming the circuit 100 will be explained more in detail later.

At first, the operation of each device of the recording & playback apparatus for monitored video data in the above configuration will be explained. Receiving a recording instruction from the operator panel 11, the control circuit 10 generates control signals needed for each corresponding block to record video data. Then, the video signals entered from a video camera (not illustrated) are supplied to the A/D converter 12 via the video input terminal 1. This A/D converter 12 converts analog video signals to 8-bit digital signals. After this, the compression encoder & decoder circuit 3 encodes the digital video signals supplied from the A/D converter 12 according to the MPEG (Moving Picture Experts Group) standard. Furthermore, the first memory 4, which is an FIFO (First In First Out) memory being capable of both writing and reading simultaneously, writes and reads MPEG data sequentially according to the control signals from the control circuit 10.

The SCSI controller 5 sends an SCSI command, which writes MPEG data read from the first memory 4 into the HDD 7 according to the control signals from the control circuit 10, to the HDD 7. The HDD 7 provided with an SCSI interface reads the command received from the SCSI controller 5 and writes the MPEG data entered into itself 7 according to the command. In addition, at a timing to be explained later, the SCSI controller 5 generates an SCSI command to instruct the HDD 7 to play back necessary data according to the control signals from the control circuit 10. According to this command, the data output from the HDD 7 is sent to the second memory 8.

Just like the first memory 4, the second memory 8 is also an FIFO memory that can write and read data simultaneously. The second memory 8 thus writes and reads data sent from the SCSI controller 5 sequentially according to the control signals from the control circuit 10. In addition, the I/F circuit 14 combines the VTR command sent from the control circuit 10 and the MPEG data output from the second memory 8 according to the IEEE1394 standard to generate serial data to be sent to the VTR 9. The VTR 9 then separates this serial data to commands and data, and writes the separated data on a magnetic tape according to the separated command. In the monitored video data recording & playback apparatus, video data from a video camera is recorded on a magnetic tape loaded in the VTR 9 via the first memory 4, the, HDD 7, and the second memory 8 in such way.

Figure 2:
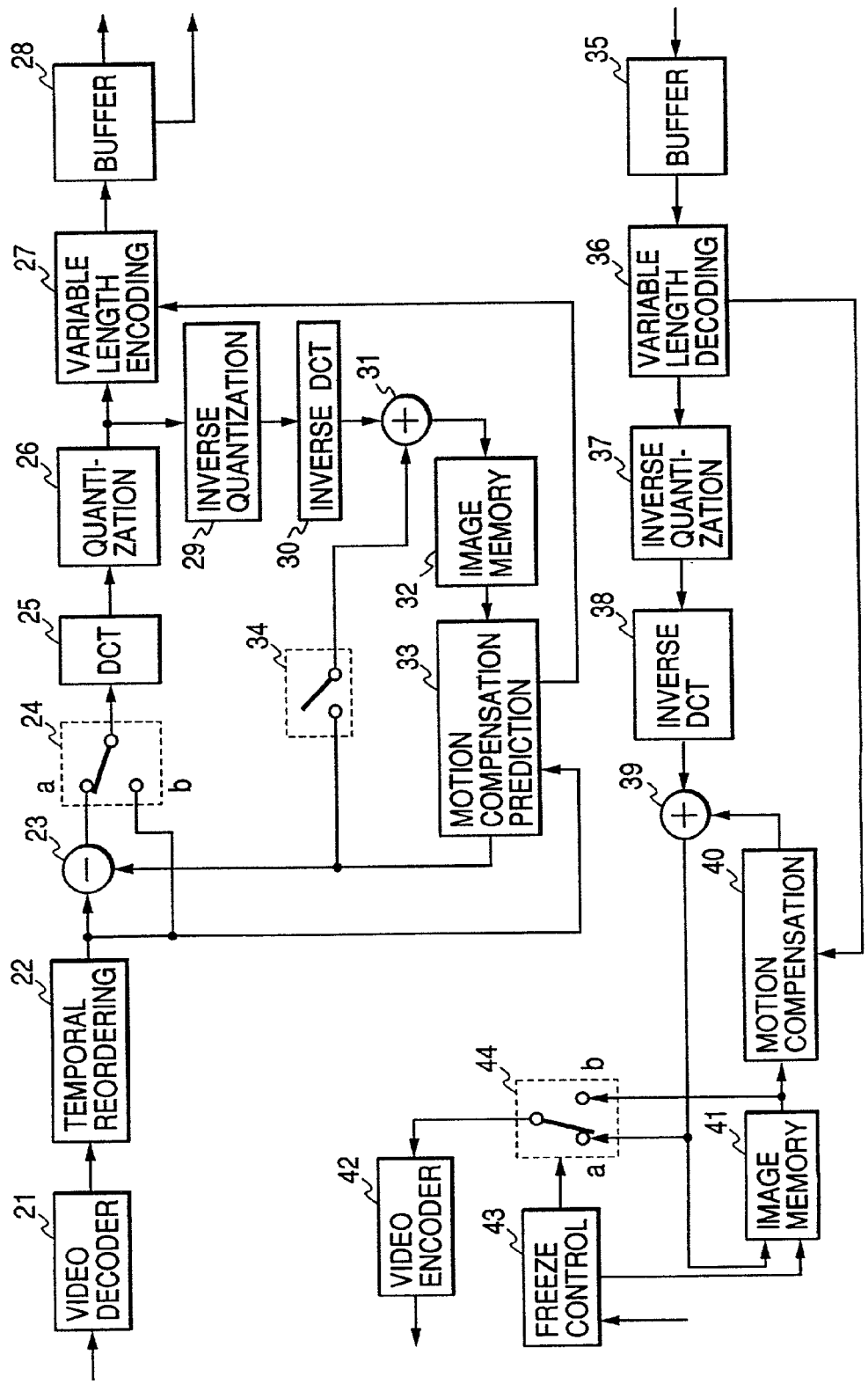
FIG. 2 is a block diagram indicating an example of the configuration of the compression encoder & decoder circuit used in the monitored video data recording & playback apparatus shown in FIG. 1.

Subsequently, the compression encoder & decoder circuit 3 will be explained. FIG. 2 is a block diagram indicating the configuration of the compression encoder & decoder circuit 3. In FIG. 2, numeral 21 indicates a video decoder circuit, 22 indicates a temporal recording circuit, 23 indicates a subtraction circuit, 24 and 34 indicate switches, 25 indicates a DCT (Discrete Cosine Transform) circuit, 26 indicates a quantizer circuit, 27 indicates a variable length encoder circuit, 28 and 35 indicate data buffers, 29 and 37 indicate inverse quantizer circuits, 30 and 38 indicate inverse DCT circuits, 31 and 39 indicate adder circuits, 32 and 41 indicate image memories, 33 indicates a motion compensation prediction circuit, 36 indicates a variable length decoder circuit, 40 indicates a motion compensation circuit, 42 indicates a video encoder circuit, 43 indicates a freeze control circuit, and 44 indicates a switch.

In the compression encoder & decoder circuit 3 having such a configuration, video signals digitalized in the A/D converter 12 are converted by the video decoder circuit 21 to luminance signals and color difference signals according to the number of pixels needed for encoding. In the case of the MPEG's B (Bidirectionally predictive-coded) pictures, video data whose timings are reversed are used for encoding, so input video data are reordered in the temporal reordering circuit 22 according to each picture type of I (Intra-coded), B, and P (Predictive-coded). In addition, input image data and difference data are selected in the switch 24 corresponding to the intra-frame encoding and The inter-frame encoding. Furthermore, selected image data is converted to a spatial frequency region in units of a block comprising 8 pixels×8 lines in the DCT circuits 25. The data is then quantized in the quantizer circuit 26 through an operation with a quantization matrix. This quantized data is encoded to variable length data in the variable length encoder circuit 27 together with the motion vector from the motion compensation prediction circuit 33 and encoded mode information. The data is then stored in the buffer 28 until it is output as MPEG bit streams.

The buffer 28 outputs the amount information of the data stored in the buffer to the control circuit 10, so that the buffer is prevented from both overflow and underflow. On the other hand, the quantized data is decoded locally by the inverse quantizer circuit 29 and the inverse DCT circuit 30, then stored in the image memory 32. The switch 34 is changed over corresponding to the intra-frame encoding and the inter-frame encoding. Furthermore, the decoding motion compensation prediction circuit 33 decides an encoding mode and detects a motion vector according to the image data from the image memory 32 and input image data. The circuit 33 also generates and outputs reference image data needed for inter-frame encoding and inter-frame decoding.

On the contrary, when in a playback operation, data is decoded by following the above recording processings in reverse. In other words, each bit stream from the first memory 4 is stored in the buffer 35 first, then the parameters of the bit stream such as encoding mode, motion vector, etc. are separated in the variable length decoding circuit 36. After this, the data is restored to image data in the inverse quantizer circuit 37 and the inverse DCT circuit 38. In addition, in the motion compensation prediction mode, block data whose motion compensation is predicted is added to the data in each of the image memory 41, the motion compensation circuit 40, and the adder circuit 39 respectively, then composite signals are generated and output from the video encoder circuit 42. The switch 44 usually selects the a side. When instructed "Freeze" from external, however, the freeze control circuit 43 stops writing into the image memory 41 at a timing at which the compression & decoding time is corrected. At the same time, the switch 44 is pushed down to the b side so that data read from the image memory 41 is entered into the video encoder 42. Thus, a frozen image can be output.

Subsequently, the details of the VTR 9 shown in FIG. 1 will be explained with reference to Table 1 and FIG. 3.

This VTR 9 conforms to the D-VHS standard so as to be enabled to record and playback digital signals on the basis of the VHS mechanical system. Table 1 shows the basic technical specifications of this D-VHS standard (STD) mode.

TABLE 1

| Tape | Newly established grade based on S-VHS tape |
| --- | --- |
| Cassette | D-VHS cassette |
| Mechanism | Based on present VHS mechanism |
| Recording Time/Capacity | Standard . . . DF-300 (5 hours, 31.7 GB) |
| | Max . . . DF-420 (7 hours, 44.4 GB) |
| Track Composition | Tape speed 16.67 mm/sec |
| | Head azimuth +−30 deg. |
| | Drum rotation 1800 rpm |
| | Tracking system CTL track system |
| Recording Specification | Main data input rate 14.1 Mbps |
| | Sub data input rate 0.146 Mbps |
| | Recording rate 19.14 Mbps |
| | Track structure 1 sector |
| | Length of sync block 112 bytes |
| | Inner ECC RS code |
| | Outer ECC RS code |
| | Code word shuffling 6 tracks |
| | Modulation system SI-NRZI |
| Interface | Based on IEEE1394 digital interface |

In other words, the speed of this D-VHS tape (refer to the section of track composition) is a half of that of the VHS standard (SP) mode. When a standard tape is used, main data (video and audio) of 14.1 Mbps (bit per second) can be recorded for 5 hours.

Figure 3:
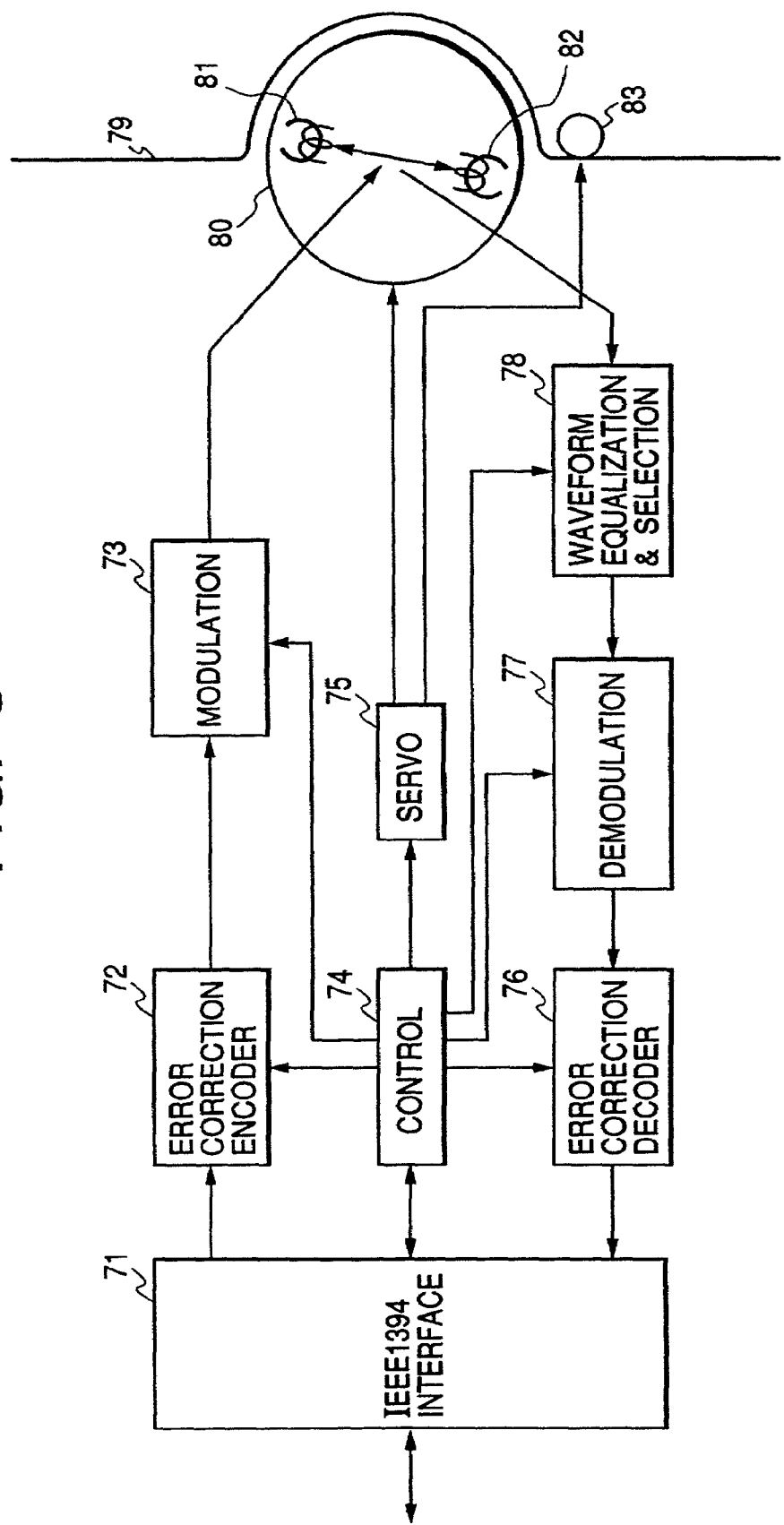
FIG. 3 is a block diagram indicating an example of the VTR circuit used in the monitored video data recording & playback apparatus shown in FIG. 1.

In the block diagram indicating the configuration of the VTR 9 shown in FIG. 3, numeral 71 indicates an IEEE1394 digital interface circuit (hereafter, to be abbreviated as I/F circuit), 72 indicates an error correction encoder, 73 indicates a modulator circuit, 74 indicates a control circuit, 75 indicates a servo circuit, 76 indicates an error correction decoder, 77 indicates a demodulator circuit, 78 indicates a wave equalizer & selector circuit, 79 indicates a magnetic tape, 80 indicates a rotary cylinder, 81 and 82 indicate magnetic heads, and 83 indicates a capstan.

In this configuration of the VTR 9, a recording mode command and data to record are entered into the I/F circuit 71 on the VTR 9 side from the I/F circuit 14 on the HDD 7 side when in a recording operation. Then, the I/F circuit 71 separates the command from the data, and sends the command to the control circuit 74 and the data to the error correction encoder 72 respectively. On the other hand, the control circuit 74 sends necessary control signals to each device to instruct the VTR 9 to execute specified operations according to the entered commands of "RECORD", "PLAYBACK", etc. In other words, the error correction encoder 72 shuffles data in units of 6 tracks as shown in Table 1, to execute RS (Read Solomon) encoding. After this, the data is modulated to SI-NRZI data in the modulation circuit 73, then recorded on the magnetic tape 79 via the magnetic heads 81 and 82 attached to the rotary cylinder 80. The servo circuit 75 controls the rotation speed and phase of the rotary cylinder 80 and the capstan 83 to form the specified tracks on the magnetic tape 79.

On the contrary, receiving the "PLAYBACK" command via the I/F circuit 71, the control circuit 74 sends control signals necessary for a playback operation to each device.

When in such a playback operation, data on the magnetic tape 79 is played back by the magnetic heads 81 and 82 and entered into the wave form equalizer & selector 78. This waveform equalizer & selector 78 integrates and equalizes data to compensate the differential characteristics by magnetic recording & playback operation, then decides "1" or "0" by comparing the result with the threshold level. In addition, the demodulator circuit 77 executes a reverse processing of the processing of the modulator circuit 73. Then, the error correction decoder 76 corrects errors generated in a recording/playback process and to restore the data order through deshuffling. And, the data from the error correction demodulator 76 is output via the I/F circuit 71.

Receiving the "STOP" command via the I/F circuit 71, the control circuit 74 sends control signals to the servo circuit 75 to stop the rotary cylinder 80 and the capstan 83, as well as unloads the magnetic tape 79 (separates the magnetic tape79 from the rotary cylinder 80).

Figure 4:
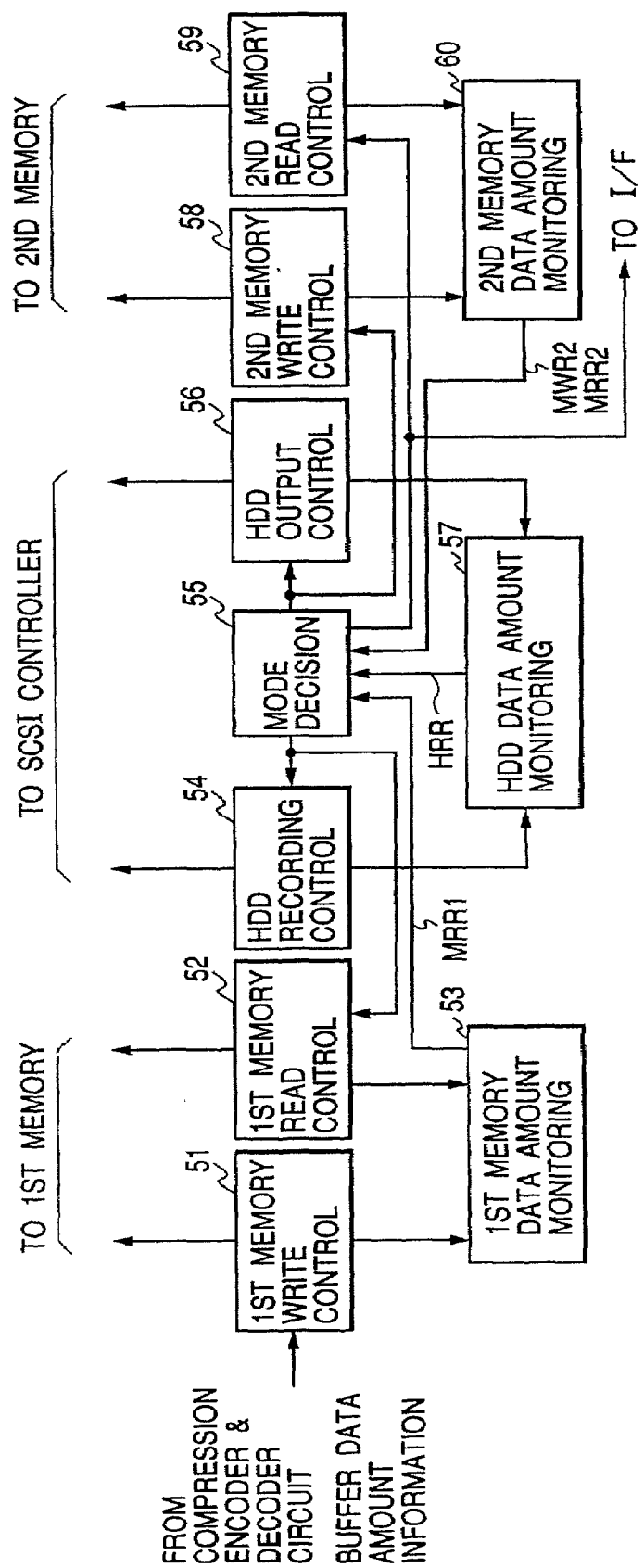
FIG. 4 is a block diagram indicating an example of the control circuit used in the monitored video data recording & playback apparatus shown in FIG. 1.

Subsequently, the operation of the control circuit 10 will be explained, especially focusing on the recording operation, with reference to FIG. 4. FIG. 4 is a block diagram indicating the configuration of the control circuit 10 when in a recording operation. In FIG. 4, numeral 51 indicates the first memory write control circuit, 52 indicates the first memory read control circuit, 53 indicates the first memory data amount monitoring circuit, 54 indicates an HDD recording control circuit, 55 indicates a mode decision circuit, 56 indicates an HDD playback control circuit, 57 indicates an HDD data amount monitoring circuit, 58 is the second memory write control circuit, 59 indicates the second memory read control circuit, and 60 indicates the second memory data amount monitoring circuit. 24

In the control circuit 10 having such a configuration, the first memory write control circuit 51 sends control signals to the first memory 4 when data is to be recorded. According to the control signals, the memory 4 writes data in itself 4. At this time, the first memory write control circuit 51 controls the average write frequency of the first memory 4 according to the data amount information from the buffer 28 of the compression encoder & decoder 3 to prevent the buffer 28 from both overflow and underflow. This operation can be realized by controlling the buffer so that, for example, data is written in the buffer 28 at a frequency higher than the average write frequency and writing is stopped temporarily when the data count in the buffer 28 comes close to zero. In addition, the first memory read control circuit 52 sends control signals to the first memory 4 according to the mode signal from the mode decision circuit 55, thus reading the data from the first memory.

The first memory data amount monitoring circuit 53 in the control circuit 10 incorporates a counter circuit used for monitoring the difference between the amount of the bit stream data stored in the first memory 4 and the amount of the data read from the memory 4. The circuit 53 generates an MRR1 (Mmeory 1 Read Request) signal according to the count value and sends the signal to the mode decision circuit 55. This MRR1 signal is used for preventing the first memory 4 from overflow. For example, the first memory 4 is set to the low level until the counter value reaches the specified value (eg., 15.5 Mbits) and to the high level when the value is exceeded, keeping the level high until the count value reaches a value close to zero (eg., 0.5 Mbits) or under.

The HDD recording control circuit 54 and the HDD playback control circuit 56 provided in the control circuit 10 respectively generate control signals necessary for recording and playing back data in and from the HDD 7 according to the commands from the mode decision circuit 55 and send the control signals to the SCSI controller 5. In other words, the HDD recording control circuit 54 increases the write address from zero sequentially and controls so that the maximum value is returned to zero cyclically. The HDD playback circuit 56 also controls write addresses just like the circuit 54. As a result, the hard disk unit (HDD) 7 works as a means of recording and playing back data cyclically, that is, as an FIFO (First In First Out). The HDD data amount monitoring circuit 57, when in recording, incorporates a counter used for monitoring the difference between the amount of the recorded data in the hard disk unit (HDD) 7 and the amount of the data read (played back) from the HDD 7. The HDD data amount monitoring circuit 57 generates an HRR (Hard Disk Read Request) signal according to this counter value and sends the signal to the mode decision circuit 55. In other words, this HRR signal prevents the HDD 7 from overflow. For example, the HDD 7 is set to the low level until the counter value reaches the second specified amount (eg., 1 GB), and the HDD 7 is sea to the high level when the counter value exceeds the second specified amount, keeping the level high until the counter value reaches a value close to zero (eq., 0.5 Mbits) or under.

Furthermore, the second memory write control circuit 58 and the second memory read control circuit 59 generate control signals necessary for a write/read operation in/from the second memory according to the commands from the mode decision circuit 55 and sends the signals to the second memory 8. On the other hand, the second memory data amount monitoring circuit 60 incorporates a counter circuit used for monitoring the difference between the amount of the bit stream data written in the second memory 8 and the amount of the data read from the memory 8. The second memory data amount monitoring circuit 60 generates an MWR2 (Memory 2 Write Request) signal and an MRR2 (Memory 2 Read Request signal according to the counter value and sends those signals to the mode decision circuit 55. This MWR2 signal requests that data is to be entered into the second memory 8 when data in the memory 8 becomes less. For example, the second memory 8 is set to the high level when the counter value reaches a ¼ capacity (4 M bits) of the full memory capacity (eg., 16 M bits), keeping the level high until the counter value reaches ¾ (12 M bits) of the second memory capacity (16 M bits) or over. When the counter value becomes ¾ or over, the memory 8 is set to the low level again. The MRR2 signal indicates that enough data is written in the second memory 8, so that data can be read from the memory 8 at a certain rate. For example, when the counter value reaches ½ of the second memory 8 capacity (16 M bits) or over, the memory 8 is set to the high level, keeping the level high until the counter value reaches zero. When the counter value reaches zero, the memory 8 is set to the low level.

The mode decision circuit 55 provided in the control circuit 10 decides an operation mode according to the MRR1 signal, the HRR signal, the MWR2 signal, and the MRR2 signal and sends commands to the first memory read control circuit 52, the HDD recording control circuit 54, the HDD playback control circuit 56, the second memory read control circuit 59 and the I/F circuit 14 so that those devices operate corresponding to the decided mode. Table 2 shows the relationships among input signals, output commands, and selected modes.

In Table 2, "-" indicates "Don't Care". When the "STOP" command is issued, the mode decision circuit 55 sends the "STOP" command to each of the above devices. Consequently, the first memory 4 stops reading, the HDD 7 stops recording/playback, the second memory 8 stops writing/reading, and the VTR9 stops recording.

When the "HDD RECORD" command is output, the mode decision circuit 55 sends the command to both the first memory read control circuit 52 and the HDD recording control circuit 54 to execute the specified operation. As a result, data is read from the first memory and the data is then written in a hard disk provided in the HDD 7 via the SCSI controller 5.

When the "HDD PLAYBACK" command is output, the mode decision circuit 55 sends the command to both the HDD playback control circuit 56 and the second memory write control circuit 58 to execute the specified operation. As a result, data is read from the hard disk provided in the HDD 7 and the data is written in the second memory via the SCSI controller 5.

TABLE 2

| Operation Mode | MRR1 | HRR | MWR2 | MRR2 | Command Output | Selected Mode |
|---|---|---|---|---|---|---|
| 1st Mode | L | L | — | — | STOP | |
| | H | — | — | — | HDD RECORD | |
| | L | H | — | — | STOP | To 2nd mode |
| 2nd Mode | L | H | L | L | STOP | |
| | H | — | — | — | HDD RECORD | |
| | L | H | H | — | HDD READ | |
| | — | — | — | H | VTR RECORD | |
| | L | L | L | L | STOP | To 1st mode |

Furthermore, when the "VTR RECORD" is output, the mode decision circuit 55 sends the command to both the second memory read control circuit 59 and the I/F circuit 14 to execute the specified operation. As a result, data is read from the second memory and the data is then recorded on the magnetic tape loaded in the VTR 9 via the I/F circuit 14.

Figure 5:
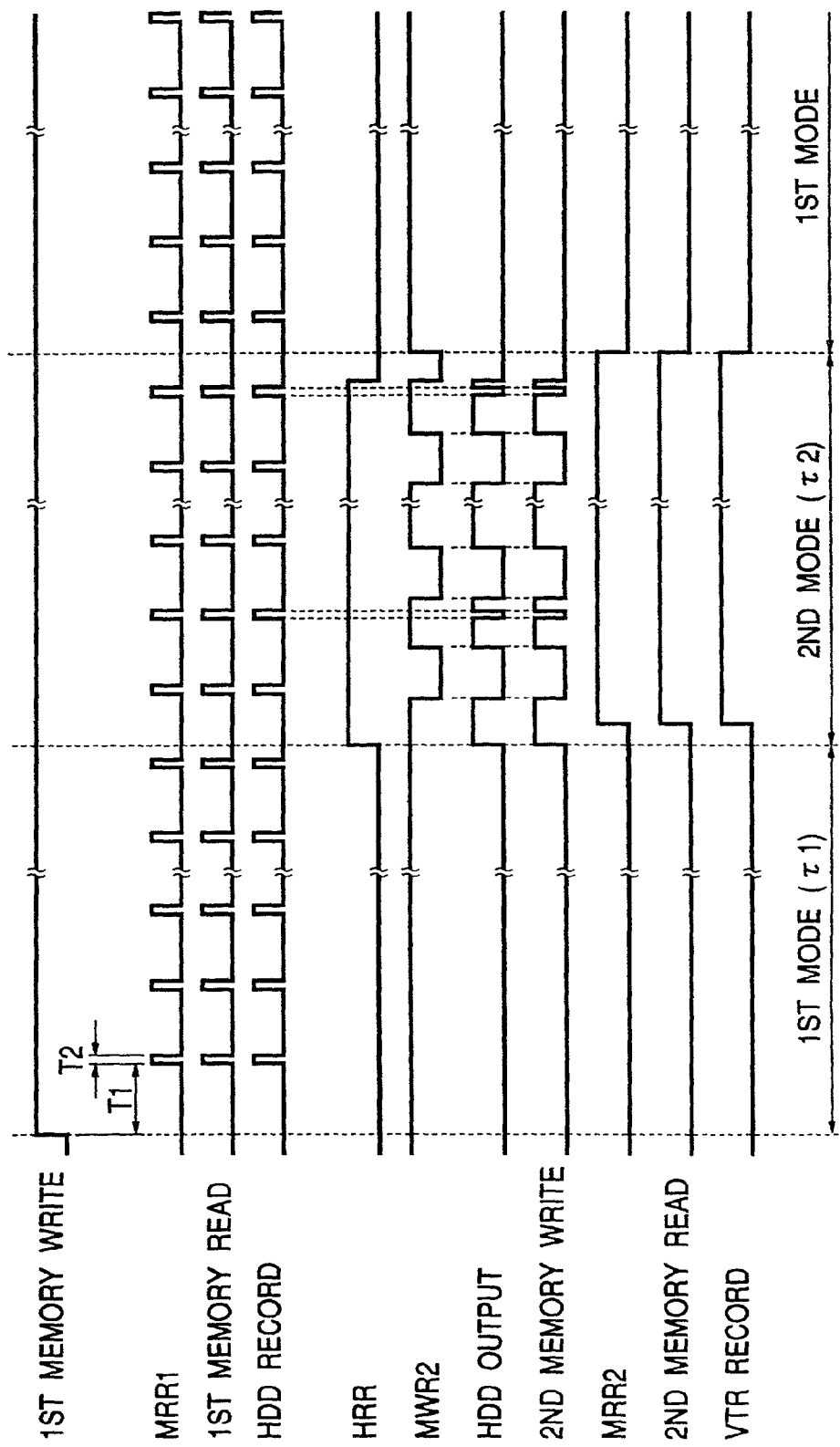
FIG. 5 is a timing chart explaining the operation of the monitored video data recording & playback apparatus, especially the operation of the control circuit shown in FIG. 1.

Subsequently, a long video recording operation of the recording & playback apparatus will be explained sequentially with reference to the timing chart shown in FIG. 5. The details of the apparatus configuration is as explained above. (The above recording operation means an operation for compressing video data on the time axis in the time axis compressing circuit 100 mentioned above.)

At first, when the apparatus begins a recording operation, data is written almost continuously in the first memory 4. (In this chart, however, the above-mentioned temporary write stop period is not described to simplify this "first memory write" signal waveform.)

After a period of time T1, the data amount in the first memory 4 reaches the first specified value (15.5 M bits) and the MRR1 signal that requests data reading from the first memory 4 is set to the high level. Consequently, data is read from the first memory 4 and the data is recorded in the HDD 7 only for the next period of time T2. In other words, data is kept read from the first memory 4 until the data amount in the memory 4 reaches 0.5 M bits. This means that about 15 M bits of data from this first memory 4 is recorded in the HDD 7. After this, reading from the first memory 4 and recording into the HDD 7 are executed intermittently in the same way.

Hereunder, the times of both T1 and T2 are calculated approximately to understand how the above operations are executed actually.

If the average data rate of the bit stream output from the compression encoder/decoder circuit 3 is assumed to be R1 (eg., R1=1.5 M bps), the time T1 required until the data amount in the first memory 4 reaches the first specified value D1 (D1=15.5 M bits) from zero (0) is calculated as follows.

$$T1 = D1/R1 = 15.5 \text{ M bits}/1.5 \text{ M bps} = 10.3 \text{ sec}$$

On the other hand, if the average recording/playback data rate of the HDD 7 is assumed to be R2 (eg., R2=30 M bps), the time T2 required for recording the data amount obtained by subtracting 0.5 M bits from the first specified value D1 (D1 (=15.5 M bits)−0.5 M bits=15 M bits) is calculated as follows.

$$T2 = (D1 - 0.5)/(R2 - R1) = 15 \text{ M bits}/(30 - 1.5) \text{M bps} \approx 0.5 \text{ sec}$$

Consequently, in the above operation mode, that is, in the first operation mode, the HDD 7 stops for about 10 sec after it begins an operation. Then, the HDD 7 records data only for about 0.5 sec. The HDD 7 repeats the operation cyclically.

After data transfer from the first memory 4 to the HDD 7 is repeated such way, the data amount in the HDD 7 increases. When the second specified value (eg., 1 GB) is reached, for example, the HRR signal (refer to the 57 shown in FIG. 4) requesting data reading from the HDD 7 is set to the high level. And, after this, the apparatus enters the second operation mode. Since the data amount in the second memory 8 is zero (0) just after this second operation mode is entered, the MWR2 signal (refer to the 60 shown in FIG. 4) requesting the second memory to read data is set still in the high level. Thus, the HDD 7 outputs data and data is written in the second memory 8. And accordingly, the data in the HDD 7 is written in the second memory 8 via the SCSI controller 5. The average output data rate of the HDD 7 is assumed to be 30 M bps just like in the above recording operation at this time.

The data amount in the second memory 8 increases due to this writing from the HDD 7. After this, when the data amount in the second memory 8 reaches 8 M bits, the MRR2 signal requesting reading from the second memory 8 is set to the high level, and accordingly, data is read from the second memory 8 and the VTR9 records the data. The reading data rate of the second memory 8 and the input data rate of the VTR 9 are set equally (14.1 M bps). This fixed rate data is recorded on the magnetic tape 79 loaded in the VTR 9 from the second memory 8 via the I/F circuit 14. The VTR 9 feeds the magnetic tape 79 continuously at a fixed rate (16.67 mm/sec) at this time. In other words, the VTR 9 is operated in the normal recording mode.

When the data amount in the second memory 8 reaches 12 M bits, the MWR2 signal requesting writing into the second memory 8 is set to the low level. Thus, the HDD 7 stops the output and the writing into the second memory 8 is also stopped. Reading from the second memory 8 and recording into the VTR 9 are continued on even during this period, however. So, the data amount in this second memory 8 is reduced little by little.

After this, when the data amount in this second memory 8 is reduced to 8 M bits, the MWR2 signal requesting writing into the second memory 8 is returned to the high level. And accordingly, data outputting from the HDD 7 and writing into the second memory are restarted. The data amount in the second memory 8 begins increasing again. As understood clearly from the waveform shown in the chart (especially, refer to the HDD OUTPUT signal), writing/reading in/from the HDD 7 is controlled so as to be time-shared.

Hereafter, the same operations are repeated, so the data amount in the HDD 7 decreases. When the data amount in the HDD 7 is reduced to 0.5 M bits or under, the HRR signal requesting reading from the HDD 7 is set to the low level. After this, however, reading from the second memory 8 and recording into the VTR 9 are continued until the data in the second memory is read completely. When the data amount in the second memory 8 reaches zero (0), the MWR2 signal is set to the high level and the MRR2 signal is set to the low level. Thus, the second operation mode is exited. In other words, the first operation mode is set again.

In the monitored video data recording & playback apparatus of the present invention, data is compressed on the time axis and the first and second operation modes are alternated as explained above when in recording and this operation is continued until the magnetic tape recording the data reaches the end of the tape.

Subsequently, the video recording time of the monitored video data recording & playback apparatus of the present invention and the VTR recording time to be reduced by the time axis compression will be explained.

If the capacity of one magnetic tape is assumed to be D3 (D3=31.7 GB for the standard tape as shown in Table 1), the possible recording time T3 is represented as follows.

$T3=D3/R1=31.7$ GB/1.5 M bps=(31.7×8×1000)M bits/1.5 M bps≈169067 sec≈47 hours

In other words, one magnetic tape can record data for about 47 hours.

However, since the total recording time T4 of the VTR 9 is obtained by dividing the magnetic tape capacity (D3) by the main data input rate (R3) shown in Table 1, the result becomes as shown below.

$T4=D3/R3=31.7$ GB/14.1 M bps=31.7×8×1000)M bits/14.1 M bits≈17986≈300 min=5 hours The periods of the first and second operation modes (first operation mode: τ1, second operation mode: τ2) when in a recording operation are as shown below.

At first, since the first operation mode period τ1 means a time required until the amount of the image data output from the compression encoder & decoder circuit 3 (bit stream average data rate=1.5 M bps) is stored in the HDD 7 and the data amount reaches the second specified value (eg., 1 GB) from the minimum value of 0.5 M bits, it is calculated as follows.

$τ1=(1$ GB−0.5 M bits)/R1=(8×1000−0.5)M bits/1.5 M bps≈5333 sec≈89 min≈1 hour 29 min On the other hand, since the second operation mode period τ2 means a time required until the data in the HDD 7 that reaches the second specified value is recorded on the magnetic tape 79 loaded in the VTR 9 (input data rate=14.1 M bps), then the data amount reaches the minimum value of 0.5 M bits (1 GB−0.5 M bits), it is calculated as follows.

$τ2=(1$ GB−0.5 M bits)/R2=(8×1000−0.5)M bits/14.1 M bps=567 sec≈9 min 27 sec

Consequently, after stopping for about one and half hours (in the first operation mode) on the standard magnetic tape (=31.7 GB) in the above apparatus due to the compressing operation executed by the time axis compression circuit 100 on the video data time axis, the D-VHS standard VTR 9 records data only for about 10 min (in the second operation mode). Repeating this cycle operation, the VTR 9 can record about 47-hour video data in an operation of about 5 hours. (This means that both the time when the magnetic tape 79 is in contact with the heads 81 and 82 and the time when the magnetic tape 79 is in contact with the rotary cylinder 80 while they are running are 5/47 of those of the conventional time lapse VTR respectively.) The conditions of this operation are not strict so much when compared with those of ordinary home VTRs. Consequently, a general home D-VHS standard VTR can be used as the VTR 9 without taking any special measures for that. The magnetic tape can also be protected from damages, since it is not kept loaded and not in contact with the capstan and the recording head for a long time. In other words, according to the present invention, the D-VHS standard VTR 9 used to record video data on a magnetic tape does not need any long time continuous recording, which is assumed as a special condition for a monitoring purpose, so a low-price home VTR can be used as the VTR 9. In addition, the failure rate is very low and the magnetic tape used for the apparatus can be protected from damages and wear. In the VTR 9 in his embodiment, the magnetic tape 79 is unloaded when the VTR 9 stops. However, the rotary cylinder may be stopped when the CTR 9 stops only to loosen the tension of the magnetic tape. Even in such a case, since the friction among the magnetic tape, the rotary cylinder, and the magnetic head is almost eliminated while the VTR 9 stops, the same effect as the above can be obtained.

On the other hand, the playback operation of the apparatus of the present invention will be as follows. The VTR 9 feeds the magnetic tape at the normal continuous feeding rate (16.67 mm/sec) to playback video data. Consequently, the output data rate of the VTR9 is 14.1 M bps. And, when in a playback operation, data flows reversely from the above recording operation; the data played back by the VTR 9 is sent to the compression encoder & decoder circuit 3 via the I/F circuit 14, the second memory 8, the SCSI controller, the HDD 7, and the first memory 4. After this, the data is MPEG-decoded, then converted by the D/A converter 13 to analog signals and output from the terminal 2.

Even in this playback operation, each memory and the HDD 7 are controlled so as to be prevented from overflow and underflow just like in the recording operation mentioned above. In addition, when in a playback operation, the transfer rate of the data to be entered into the compression encoder & decoder circuit 3 is 1.5 M bps just like at the recording time. So, the VTR 9 carries out a normal playback operation only while the specified amount of data is stored in the HDD 7. Otherwise, the VTR 9 stops. Even while the VTR 9 stops, however, data is read from the HDD 7 and sent to the compression encoder & decoder circuit 3. The flow of output video data is thus never stopped. The method to control this playback operation is similar to the above recording method, so detailed explanation of the operation timing will be omitted here. Consequently, the operation time of the VTR 9 for playing back 47-hour video data that can be recorded on one standard magnetic tape will also be only about 5 hours in this case.

Subsequently, the monitored video data recording & playback apparatus in the second embodiment of the present invention will be explained.

In this second embodiment, the input video data time axis is thinned out to record video data at a smaller rate and enable super-long time continuous recording of video data.

Figure 6:
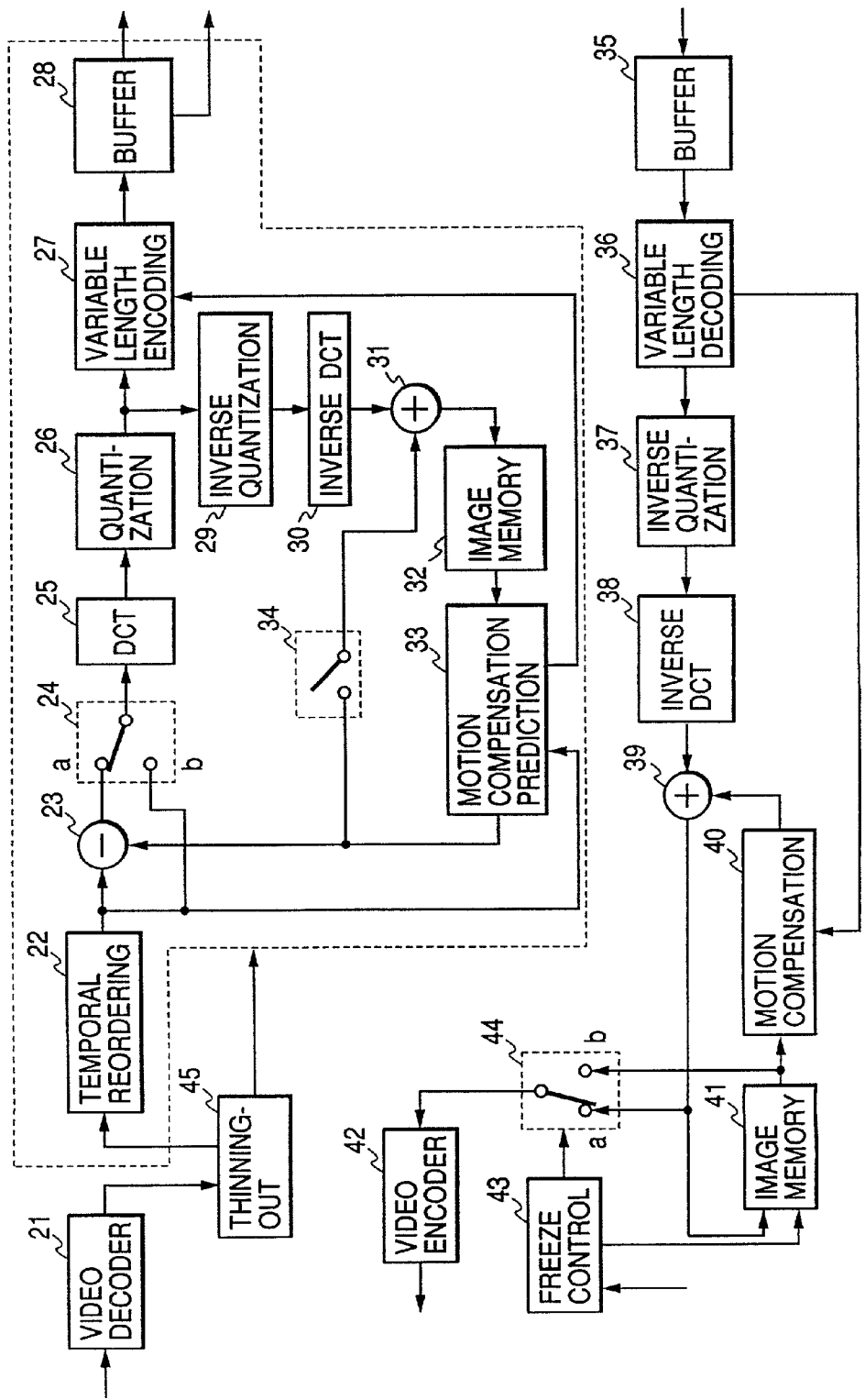
FIG. 6 is a block diagram indicating an example of the compression encoder & decoder circuit used in the monitored video data recording & playback apparatus in the second embodiment of the present invention.

At first, FIG. 6 is a block diagram of the compression encoder & decoder circuit (refer to 3 in FIG. 1, and FIG. 2) to thin out the above time axis. This compression encoder & decoder circuit differs from the compression encoder & decoder circuit 3 shown in FIG. 2 in that a thinning-out circuit 45 is added and the speed of the compression encoding main processor (enclosed by a broken line) operation can be changed according to the mode signal from the thinning-out circuit 45. This thinning-out circuit 45 writes the frame period of video data from the decoder 21 in a memory and reads the data from the memory for a k-frame period at a reading rate of 1/k (k=a natural number of 2 or over).

Figure 7:
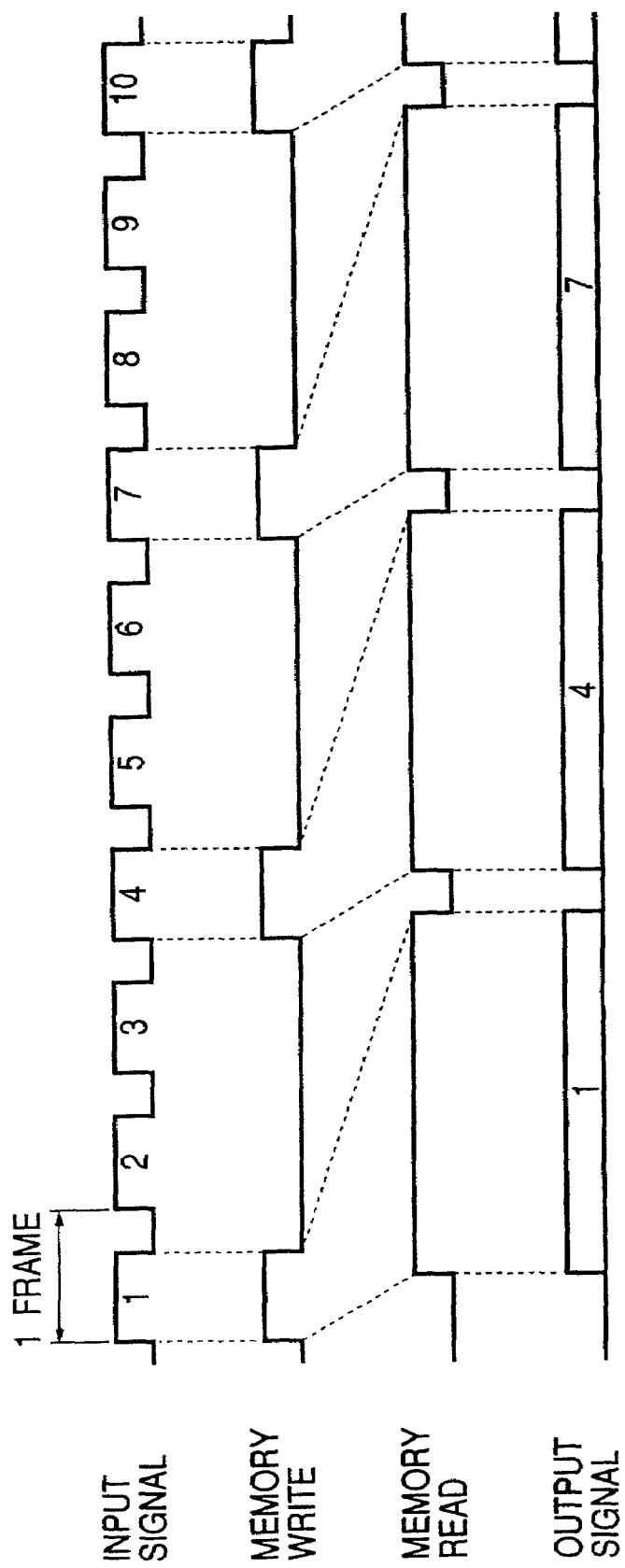
FIG. 7 is a timing chart indicating the operation of the thinning-out circuit in the second embodiment shown in FIG. 6.

FIG. 7 shows the input and output timings of the thinning-out circuit 45 when the k value is 3. In this case, the operation speed of the compression encoding main processor is set to ⅓. Consequently, the input signal time axis is thinned out to ⅓, and the compressed and encoded bit stream is output from the buffer at a ⅓ data rate (0.5 M bps when other conditions such as quantization, etc. are the same as those of the first embodiment). In addition, one magnetic tape can record data for 141 hours, which is three times that of the first embodiment (47 hours).

According to the second embodiment, the output data rate of the compression encoder & decoder circuit 3 becomes 1/k, so one standard magnetic tape can record (monitor) k times (47×k hours) when other conditions such as quantization, etc. are the same as those of the first embodiment. However, when the recording time of the VTR 9 can be calculated with the above expression, the result becomes 5 hours just like in the first embodiment. And, the VTR 9 stops for a 1.5×k hours (in the first operation mode), then records data only for about 10 min (in the second operation mode) at this time. Consequently, the wear and damages of the magnetic tape 79, the heads 81 and 82, and the rotary cylinder 80 in the VTR 9, as well as the degradation of the motor, the belt, and other items can be reduced to 1/k of those of the first embodiment respectively (when the monitoring/recording time is the same).

Figure 8:
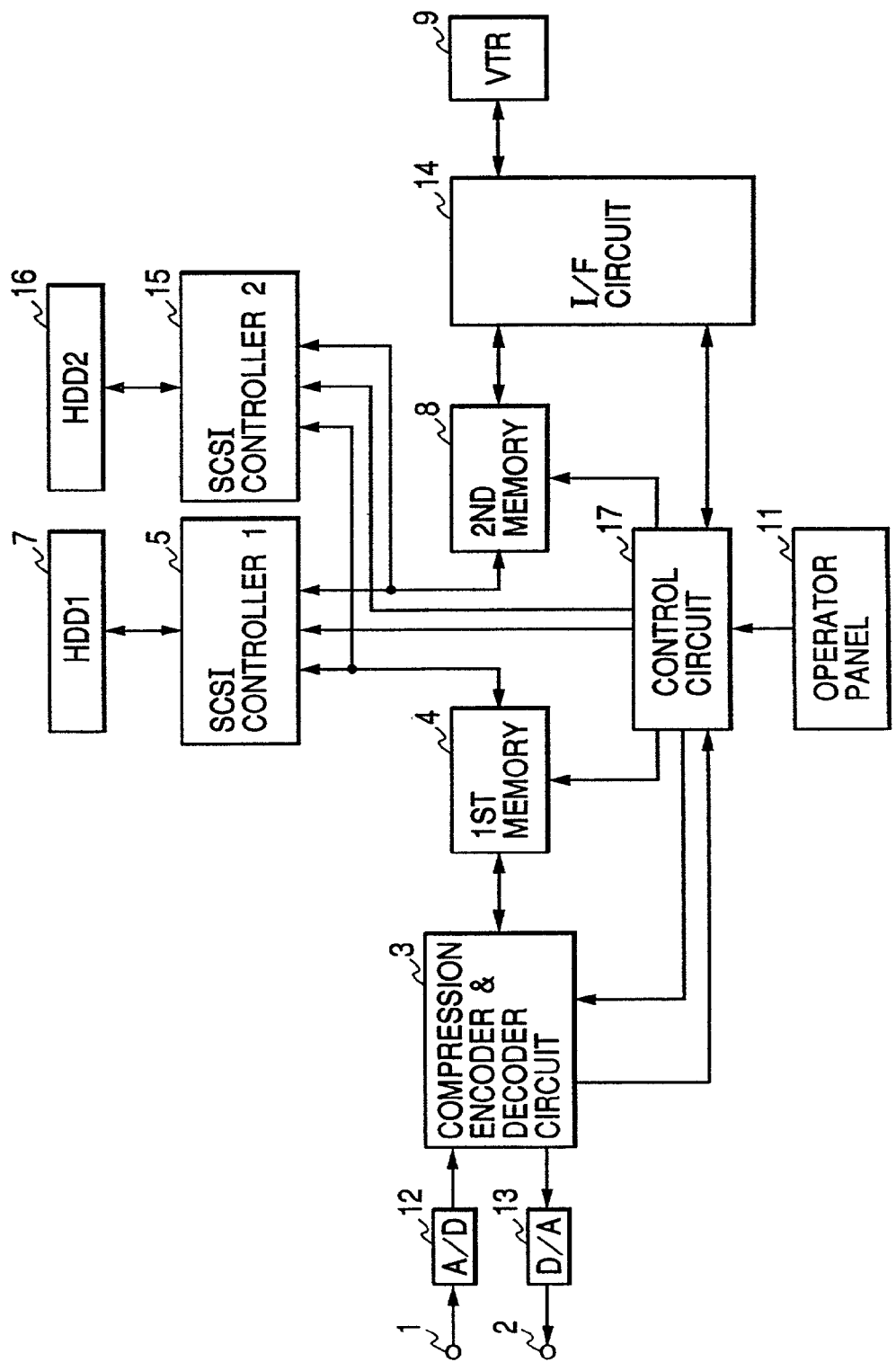
FIG. 8 is a block diagram indicating the configuration of the monitored video data recording & playback apparatus in the third embodiment of the present invention.

Subsequently, the third embodiment of the present invention will be explained. FIG. 8 is a block diagram of the monitored video data recording & playback apparatus in the third embodiment of the present invention. In FIG. 8, numeral 15 indicates the second SCSI controller (SCSI controller 2), 16 indicates the second hard disk unit, and 17 indicates a control circuit. Other items given the same numerals as those in FIG. 1 are the same as those in FIG. 1. In the above configuration, data output from the first memory 4 is recorded in both the first hard disk unit 7 (hereafter, to be abbreviated as HDD 1) and in the second hard disk unit (hereafter, to be abbreviated as HDD 2) alternately. Data output from the HDD 1 and from the HDD 2 alternately is written into the second memory 8. Also in this third embodiment, data is written/read into/from HDD in any case via the SCSI controller 5 or 15 just like in the first embodiment.

Figure 9:
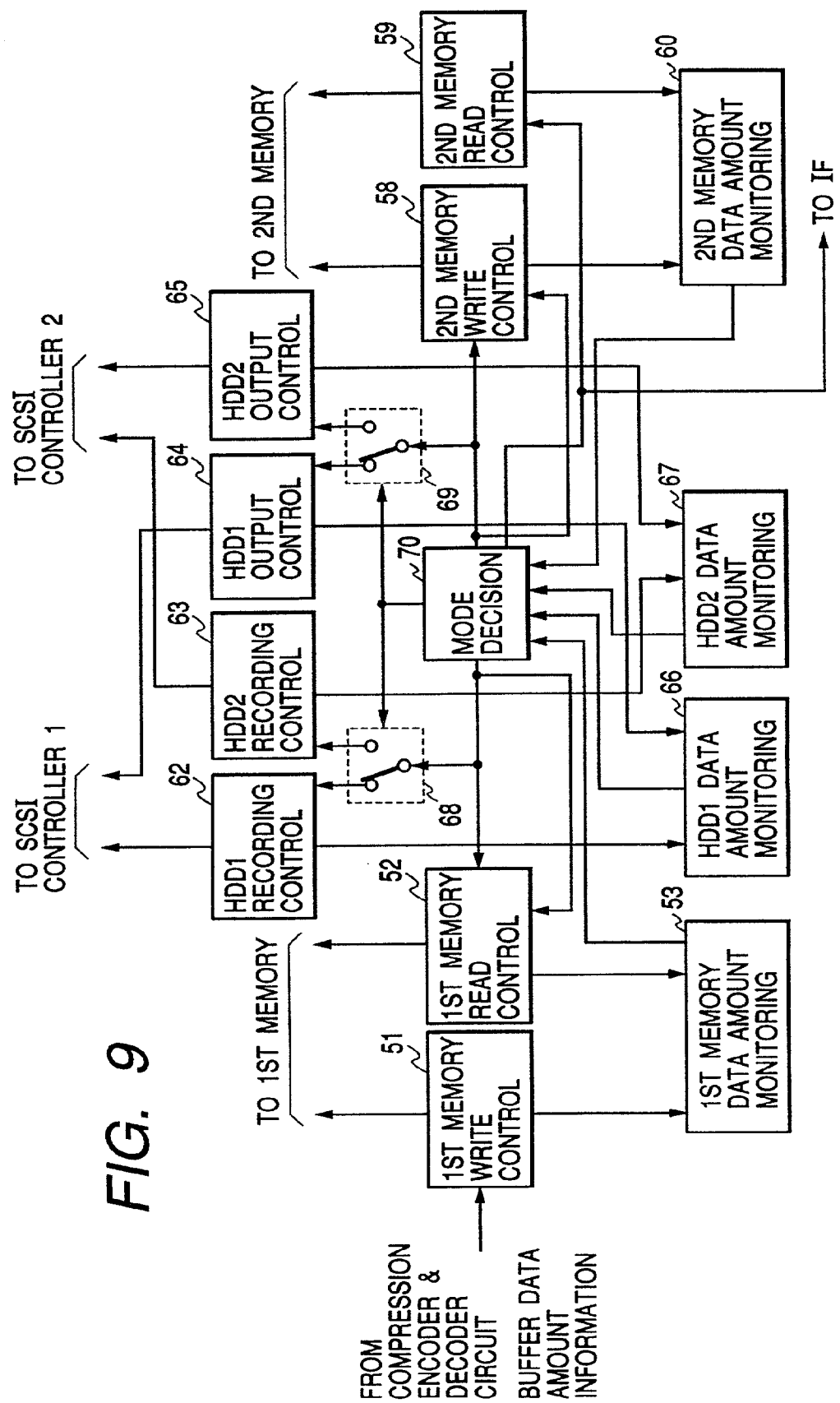
FIG. 9 is a block diagram indicating an example of the configuration of the control circuit used in the monitored video data recording & playback apparatus in the third embodiment.

FIG. 9 is a block diagram of the control circuit 17 shown in FIG. 8 especially in a recording operation. In FIG. 9, numeral 63 indicates an HDD2 recording control circuit, 64 indicates an HDD1 output control circuit, 65 indicates an HDD2 output control circuit, 66 indicates an HDD1 internal data amount monitoring circuit, 67 indicates an HDD2 data amount monitoring circuit, 68 and 69 indicate switches, and 70 indicates a mode decision circuit. Other items given the same numerals as those in FIG. 6 are the same as those in FIG. 4.

Hereunder, the recording operation of this control circuit 17 will be explained. At first, the HDD recording control circuits 62 and 63 function just like the HDD recording control circuit 54 shown in FIG. 6. The HDD output control circuits 64 and 65 also function just like the HDD output control circuit 56 shown in FIG. 6. In addition, the HDD1 data amount monitoring circuit 66 functions just like the HDD data amount monitoring circuit 57 shown in FIG. 4. In other words, the circuit 66 generates the HRR1 (Hard Disk 1 Read Request) signal and sends the signal to the mode decision circuit 70. The HDD data amount monitoring circuit 67 also functions just like the HDD data amount monitoring circuit 57 shown in FIG. 4. The circuit 67 generates the HRR2 (Hard Disk 2 Read Request) signal and sends the signal to the mode decision circuit 70.

The mode decision circuit 70 outputs commands to each device according to the MRR1 signal, the HRR1 signal, the HRR2 signal, MWR2 signal, and the MRR2 signal entered into itself and controls the switches 68 and 69. Table 3 shows the relationships among those input signals, output commands, and switch controls.

In other words, the "HDD RECORD" command is sent to the HDD1 or HDD2 record control circuit 62 or 63 via the switch 68. The "HDD OUTPUT" command is sent to the HDD1 or HDD2 output control circuit 64 or 65 via the switch 69.

Figure 10:
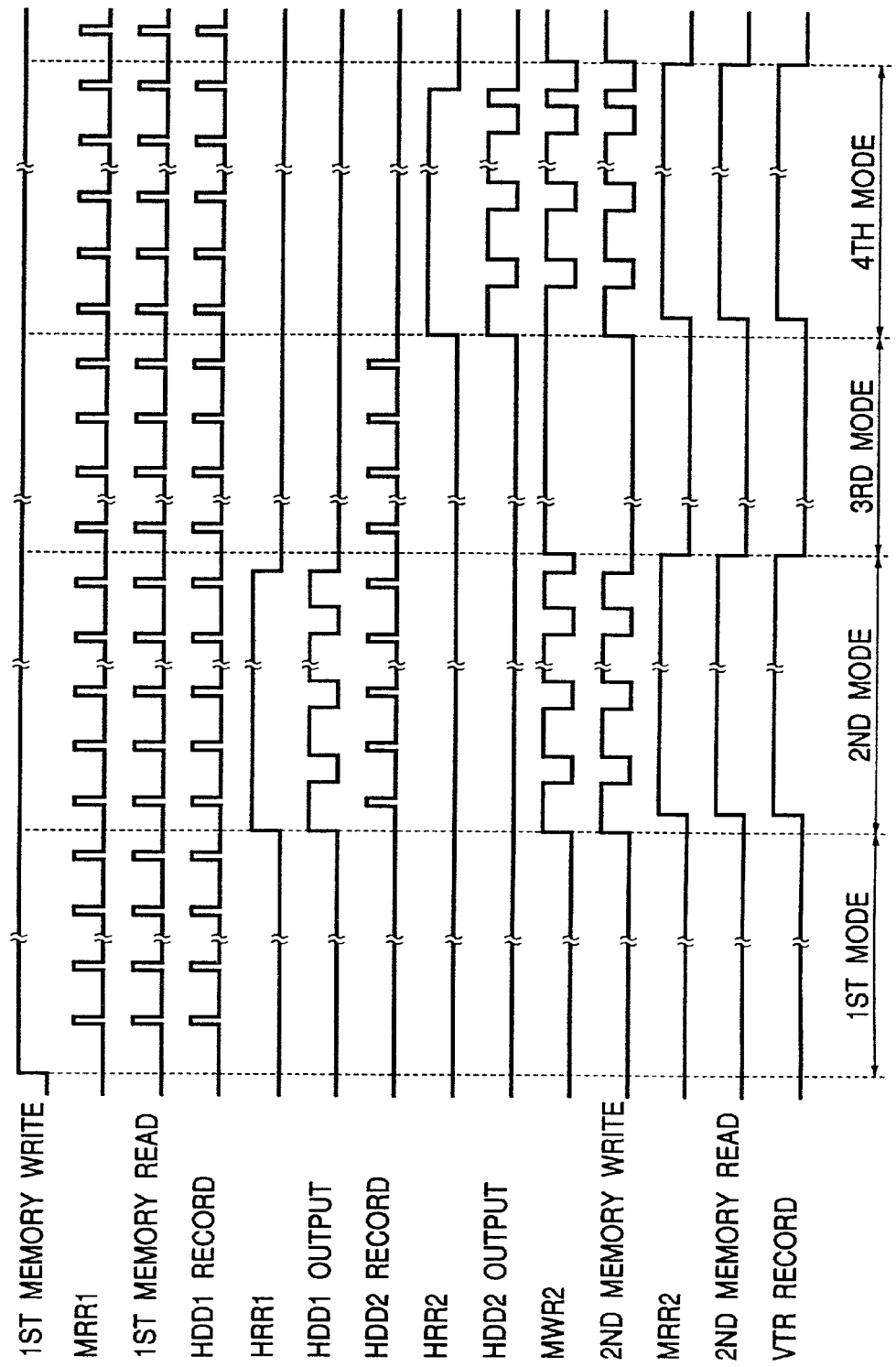
FIG. 10 is a timing chart indicating the operation of the control circuit used in the monitored video data recording & playback apparatus in the third embodiment.

Subsequently, the operation of the monitored video data recording & playback apparatus whose configuration is explained above will be explained with reference to the timing chart shown in FIG. 10. The explanation will be made mainly for the differences from the first embodiment, centering on the recording operation.

When a recording operation is started, the first operation mode (the first mode in FIG. 10) is set. At this time, the switch 68 selects the HDD1 and the switch 69 selects the HDD2 according to the control signals from the mode decision circuit 70. Consequently, the operation in this first operation mode becomes the same as that in the first operation mode in the first embodiment. Then, the data in the HDD1 increases. When the HRR1 signal is set to the high level, the second operation mode (second mode) is set.

In this second operation mode, the mode decision circuit 70 makes the switch 68 select the HDD2. As a result, the "HDD RECORD" command is entered into the HDD2 in the second operation mode. And, the data read from the first memory 4 is written into the HDD2. On the other hand, the switch 69 is changed over to select the HDD1. Then, the "HDD OUTPUT" command is entered into the HDD1 in the second operation mode. Consequently, the data output from the HDD1 is written into the second memory 8. In other words, in this third embodiment, the output from the HDD1 is always executed according to the MWR2 signal unlike the first embodiment. Recording into the HDD1 is thus never interrupted by the MRR1 signal. The data amount in the HDD1 decreases due to this output operation. When the data amount reaches 0.5 M bits or under, the HRR1 signal is set to the low level. After this, the data amount in the second memory 8 reaches zero (0), when the MRR2 signal is set to the low level. As a result, the operation enters the third operation mode (3rd mode).

TABLE 3

| Operation Mode | MRR1 | HRR1 | HRR2 | MWR2 | MRRR2 | Command Output | SW68 | SW69 | Mode Change |
|---|---|---|---|---|---|---|---|---|---|
| 1st Mode | L | L | — | — | — | STOP | HDD1 | HDD2 | |
| | H | — | — | — | — | HDD RECORD | | | |
| | L | H | — | — | — | STOP | | | To 2nd mode |
| 2nd Mode | L | H | — | L | L | STOP | HDD2 | HDD1 | |
| | H | H | — | — | — | HDD RECORD | | | |
| | — | H | — | H | — | HDD OUTPUT | | | |
| | — | — | — | — | H | VTR RECORD | | | |
| | — | L | — | — | L | STOP | | | To 3rd mode |
| 3rd Mode | L | — | L | — | — | STOP | HDD2 | HDD1 | |
| | H | — | — | — | — | HDD RECORD | | | |
| | L | — | H | — | — | STOP | | | To 4th mode |
| 4th Mode | L | — | H | L | L | STOP | HDD1 | HDD2 | |
| | H | — | H | — | — | HDD RECORD | | | |
| | — | — | H | H | — | HDD OUTPUT | | | |
| | — | — | — | — | H | VTR RECORD | | | |
| | — | — | L | — | L | STOP | | | To 1st mode |

In this third operation mode, the switches 68 and 69 are set just like in the second operation mode. The data read from the first memory 4 is thus written into the HDD2. This HDD2 does not output any data at this time. So, the data amount in the HDD2 increases. And, when the HRR2 signal enters the high level, the fourth operation mode (4th mode) is set.

In this fourth operation mode, the switches 68 and 69 are set just like in the first operation mode. In this fourth mode, writing and reading into/from HDD1 and HDD2 are alternated by exchanging the HDD1 and HDD2. In other words, when the data amount in the HDD2 becomes less and the HRR2 signal enters the low level, and then when the data amount in the second memory 8 becomes zero (0) and the HRR2 signal enters the low level, the operation mode returns to the first one.

In the monitored video data recording & playback apparatus in the third embodiment of the present invention explained above, the output from the HDD 7 or 16 is never interrupted by the MRR1 signal. In other words, recording and output operations are not time-shared. Consequently, the present invention can have an advantage for using a hard disk unit whose recording or output data rate is comparatively low. In other words, when the output rate of the compression encoder & decoder circuit 3 is 1.5 M bps, the recording rate should be 1.5 M bps or over. When the input data rate of the VTR 9 is 14.1 M bps, the playback data rate should be 14.1 M bps or over. And, just like in the firs embodiment, the wear and degradation of the magnetic tape 79, the head 81 and 82, and other mechanical parts can be reduced effectively.

Figure 11:
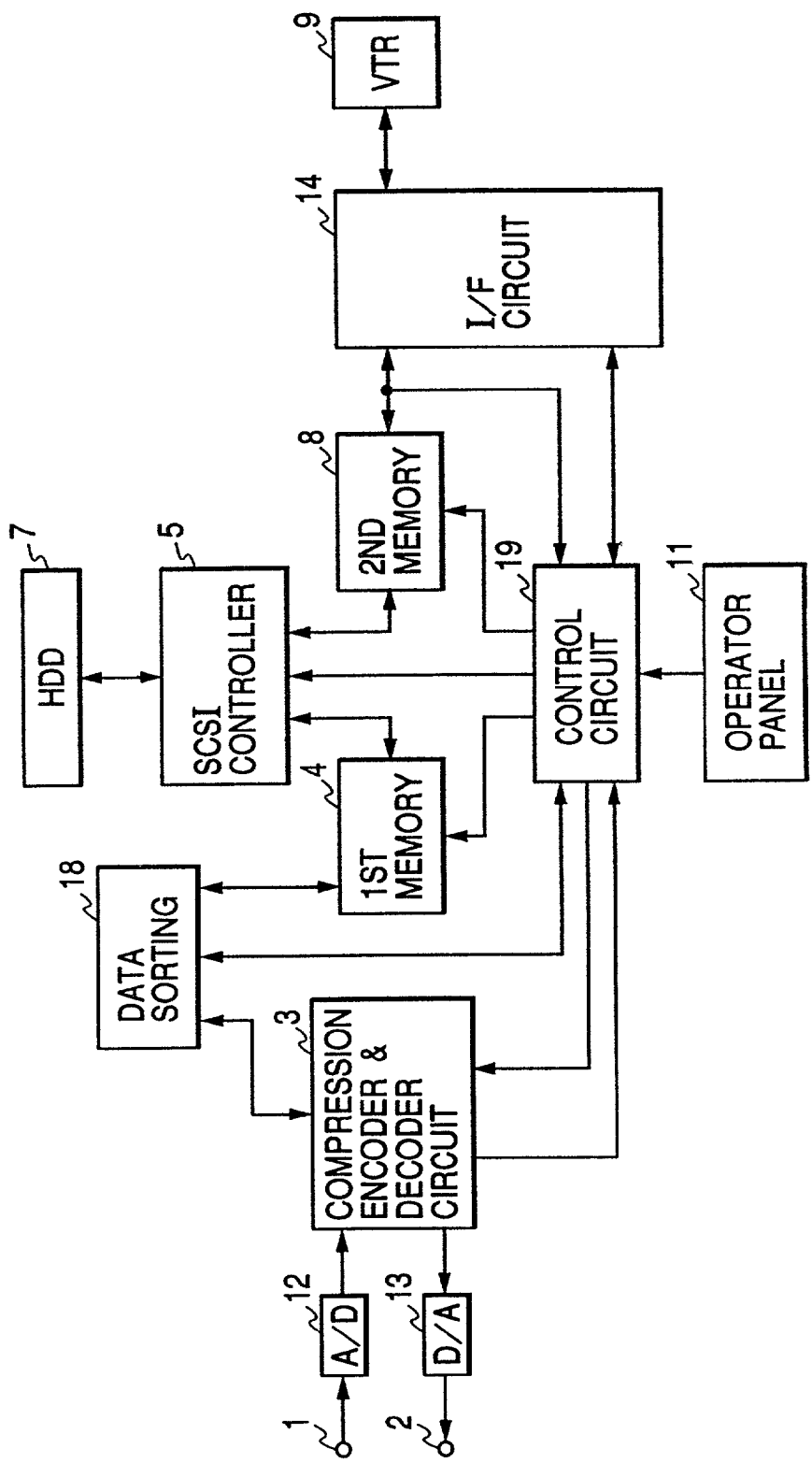
FIG. 11 is a block diagram indicating the configuration of the monitored video data recording & playback apparatus in the fourth embodiment of the present invention.

Hereunder, another embodiment of the present invention will further be explained. FIG. 11 is a block diagram of the monitored video data recording & playback apparatus in the fourth embodiment of the present invention. In FIG. 11, numeral 18 indicates a data sorting circuit and 19 indicates a control circuit. Other items given the same numerals as those in FIG. 1 are the same as those in FIG. 1.

Figure 12:
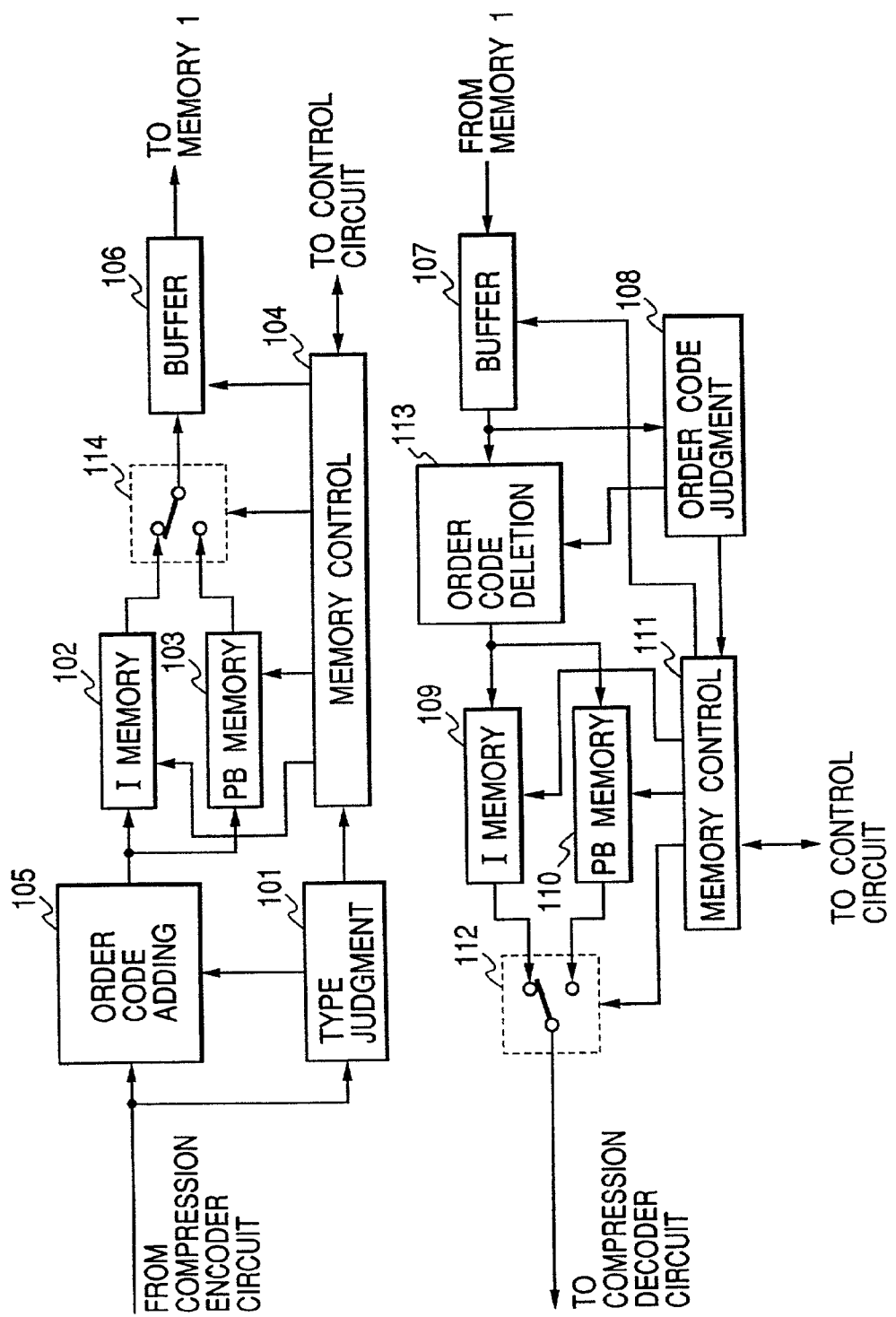
FIG. 12 is a block diagram indicating an example of the configuration of the data order change circuit used in the monitored video data recording & playback apparatus shown in FIG. 11.

FIG. 12 is a block diagram indicating the configuration of the data sorting circuit 18. In FIG. 12, numeral 101 indicates a type judgement circuit, 102, 103, 109, and 110 indicate FIFO memories, 104 and 111 indicate memory control circuits, 105 indicates an order code adding circuit, 106 and 107 indicate FIFO buffers, 108 indicates a code decision circuit, 112 and 114 indicate switch circuits, and 113 indicates an order code deletion circuit.

In the configuration of the above data sorting circuit 18, the type decision circuit 101 detects the sync code (Picture Start Code to be abbreviated as PST) and the video type code (Picture Coding Type to be abbreviated as PCT) for starting a picture layer from the MPEG bit stream output from the compression encoder & decoder circuit 3 when in a recording operation to decide the video type (I picture, P picture, or B picture) and sends the information to the memory control circuit 104 and the order code adding circuit 105. The order code adding circuit 105 adds an order code to each picture. This order code indicates the order of each picture layer in the MPEG bit stream. For example, the order code is generated in the counter circuit counting up each time a PST is detected. The memory control circuit 104 receives the data amount information of the buffer 28 output from the compression encoder & decoder circuit 3 through the control circuit 19 and generates control signals for writing data into the memories 102 and 103 according to the information (so as to prevent the buffer 28 from overflow and underflow). At this time, P and B picture data are controlled so as to be written into the PB memory 103 according to the video type information output from the type judgement circuit 101. Other data, that is, various sync codes and the data such as the number of pixels, the number of lines, etc. in the video sequence layer, as well as I picture are written into the I picture memory 102. Furthermore, the memory control circuit 104 counts the data amount of both P and B pictures using entered video type information. The circuit 104 resets the count value when the specified value is reached (eg., 600 tracks on the magnetic tape). The circuit 104 then generates control signals so that the data having been written into the I memory 102 so far is read and transferred to the buffer 106 via the switch 114. After this, the circuit 104 generates control signals so that the data written into the PB memory 103 is read during the above same period and transferred to the buffer 106 via the switch 114.

FIG. 13 is a timing chart of the data sorting circuit 18 when in a recording operation. As understood clearly from this chart, writing and reading into/from the I memory 102 and the PB memory 103 are controlled as explained above to obtain the output bit stream as shown at the bottom in FIG. 13. In other words, I picture data (including various sync codes and data such as the number of pixels, the number of lines, etc. in the video sequence layer) is output first, then P and B picture data for 600 tracks is output. FIG. 13 shows data output (P and B pictures for 600 tracks) only by once, but the operation is repeated actually to output a bit stream comprising only an I picture and a bit stream comprising P and B pictures are output alternately.

The bit stream shown in FIG. 13 and output from the data sorting circuit 18 is transferred to the VTR 9 via the first memory 4, the SCSI controller 5, the HDD 7, the second memory 8, and the I/F circuit 14 just like in the first embodiment, so that the data is recorded on the magnetic tape 79. As for the track pattern on the magnetic tape 79, a section recording only an I picture and a section recording P and B pictures are alternated. Thus, 600 tracks are recorded with P and B pictures.

In the monitored video data recording & playback apparatus in this fourth embodiment, the data played back by the VTR 9 is entered into the data sorting circuit 18 via the I/F circuit 14, the second memory 8, the SCSI controller 5, the HDD 7, and the first memory 4 when in a normal playback operation. This entered playback data is then entered into both the order code deletion circuit 113 and the code judgement circuit 108 via the buffer 107. The code decision circuit 108 detects the PCT (Picture Coding Type) and the order code added in the order code addition circuit 105 when in a recording operation and sends both information items to the memory control circuit 111 and the order code deletion circuit 113. This order code deletion circuit 113 deletes the order code from the playback data using the order code timing information output from the code judgement circuit 108. The memory control circuit 111 generates control signals according to the video type (I, P, and B pictures information from the code judgement circuit 108 so that P picture data is written into the I memory 109 and P and B picture data is written into the PB memory 110. The memory control circuit 111 generates control signals according to the order indicated by the order code output from the code judgement circuit 108 so that data is read from the I memory 109 and the PB memory 110. This read data is then output via the switch 112 and sent to the compression encoder & decoder circuit 3. When in a normal playback operation, the switch 112 selects the memory from which data is read. As explained above, when in a normal playback operation, the data order changed when in a recording operation is returned to the initial order and normal MPEG bit streams are sent to the compression encoder & decoder circuit 3. The compression encoder & decoder circuit 3 executes normal MPEG-decoding to reproduce NTSC signals just like in the first embodiment.

Subsequently, the fast playback operation of the monitored video data recording & playback apparatus in the fourth embodiment of the present invention will be explained. When a "fast playback" is instructed from the operator panel, the control circuit 19 sends the "NORMAL PLAYBACK" command to the VTR 9 via the I/F circuit 14. According to the command, the VTR 9 plays back data from the magnetic tape. Playback data is then sent to the second memory via the I/F circuit 14, and to the control circuit 19 at the same time. The control circuit 19 detects the PCT (Picture Coding Type) in the playback data to decide the playback data video type. When the video type is decided to be I type, the "normal playback" operation is continued. And, the playback data is entered into the data sorting circuit 18 via the second memory 8, the SCSI controller 5, the HDD 7, and the first memory 4. The playback data entered into the data sorting circuit 18, after the order code is deleted from itself in the order code deletion circuit 113 just like when in a normal playback operation, is written into the I memory 109. Reading from this I memory 109 is executed intermittently as shown in the timing chart in FIG. 14. While no data is read from the I memory 109, the memory control circuit 111 generates the freeze signal. This freeze signal is sent to the compression decoder circuit 3 via the control circuit 19. The compression decoder circuit 3 delays the freeze signal by a time required to the decoding and stops writing into the image memory 41. At the same time, the circuit 3 changes over the switch 44 to the output of the image memory 41. Consequently, compressed and decoded video data and its frozen data are output alternately. In the timing chart shown in FIG. 14, one decoded image frame is frozen twice. In this FIG. 14, it is assumed that I pictures are encoded at pitches of 15 frames. Each output picture is numbered. As shown in FIG. 14, after the first picture is output by 3 frames, the 16th picture is output by 3 frames, and then the 31st picture is output by 3 frames. Consequently, the average change speed of the output pictures becomes 15/3=5 times. In other words, pictures are output at a 5-time speed.

When such a normal playback operation is continued, the magnetic tape comes to a region where P and B pictures are recorded. Then, the control circuit 19, when deciding the playback data picture type to be a P or B picture, sends the "600 TRACKS FAST FEED" command to the VTR 9 via the I/F circuit 14. The VTR 9 plays back the CTL signals recorded in the control track of the magnetic tape and feeds the magnetic tape fast by counting the CTL. When the CTL count value reaches 600 tracks, the VTR 9 sends the "end of fast feed" information to the control circuit 19 via the I/F circuit 14. The control circuit 19 sends the "NORMAL PLAYBACK" or "STOP" command to the VTR 9 via the I/F circuit 14 according to the data amount in the HDD. In other words, when the data amount is less, the "NORMAL PLAYBACK" command is sent. When the data amount is much and the HDD might overflow, the "STOP" command is sent.

As explained above, according to the fourth embodiment of the present invention, only I pictures can be played back and output selectively. Thus, the playback pictures can be displayed fast. Furthermore, since the operation mode of the VTR 9 in a playback operation of the I pictures is normal playback, the tracing angles of the heads 81 and 82 match with the angle of the recording track pattern on the magnetic tape 79. This is why perfect pictures can be played back with less S/N degradation. In the above embodiment, since two frames of a picture are frozen, the picture is fed at a 5-time speed. The speed can be selected as follows. If only a frame is frozen, the picture can be fed at a 10-time speed, and furthermore, the picture can be fed at a 15-time if no frame is frozen.

As understood clearly from the above detailed explanation, according to the apparatus and method of the present invention for recording and playing back monitored video data, the video data to record is compressed on the time axis, so the period of recording video data becomes shorter than the period in which video signals are generated continuously. Consequently, the apparatus requires no mechanism to feed the magnetic tape very slowly or intermittently, since a recording operation is not continued for a long time. It can be done intermittently unlike the conventional method, which must continue recording of data while the VTR must be in contact with the magnetic tape while the recording head rotates. Any general home VTR can thus be used as the VTR of the present invention, reducing the cost significantly. In addition, the apparatus can record video data for a long time enough for the purpose of monitoring. And, furthermore, the method of the present invention can suppress the degradation of the magnetic tape, the wear of the recording heads, or the degradation of the driving belt and other mechanical items significantly. When the time axis is thinned out, the rate of the operation time of the second recording & playback apparatus becomes lower than the monitoring and recording time. Thus, the above effect increases further more.

In addition, according to the monitored data recording & playback apparatus of the present invention, the VTR can record and play back data at a normal tape feed speed, so it does not require controlling of high precision intermittent tape feeding, which is indispensable for the prior art time lapse VTR. The manufacturing cost of the apparatus can thus be reduced significantly, as well as the apparatus can be free of the S/N degradation to be caused by mismatching of the track angle on the magnetic tape with the tracing angle of the recording head, enabling good quality playback pictures to be output.

Furthermore, according to the monitored data recording & playback apparatus of the present invention, only the video data compressed and encoded at the m-frame time intervals is recorded in units of n frames on the magnetic tape, so only that portion is usually played back and other portions are fed fast, so that video data can be played back fast with no N/S degradation to be caused by mismatching of the track angle on the magnetic tape with the tracing angle of the recording head.

What is claimed is:

1. An apparatus for recording and playing back monitored video data, which can record video data for a long time, comprising:

first memory means for storing video data temporarily;

first recording and playing back means for recording and playing back output data from said first memory means in a recording medium;

second memory means for storing playback data from said first recording & playback means temporarily; and second recording and playing back means for recording data output from said second memory means on a magnetic tape by forming oblique tracks on said magnetic tape, controlling means for controlling the operations of writing and reading of said first and second memory means and recording and playback operations of said first and second recording and playback means, said controlling means further includes the steps of;

controlling so that reading video data from said first memory means and recording by said first recording & playback means are repeated each time the first specified data amount is reached in a recording operation, executing playback operation of said first recording & playback means and recording operation of said second recording & playback means in first operation mode so that those operations are stopped until the data recorded by said first recording & playback means and not played back yet reaches second specified data amount which is greater than said first specified data amount, and setting second operation mode so that recording and playback operations of said first recording & playback means are time-shared until data of said second specified data amount is played back completely, when said data recorded and not played back yet reaches said second specified data amount, and executing the recording of the data read by said second memory means at a specified transfer speed in second operation mode in which recording by said second recording & playback means is performed while feeding the magnetic tape continuously by forming tracks obliquely on said magnetic tape.

2. An apparatus for recording & playing back monitored video data, comprising first memory means for storing video data temporarily;

first and second recording and playing back means for recording and playing back data output from said first memory means on a recording medium;

second memory means for storing playback data temporarily from said first and second recording & playback means;

third recording and playing back means for recording and playing back data output from said second memory means on a magnetic tape by forming oblique tracks on said magnetic tape; and controlling means for controlling the operations of writing and reading of said first and second memory means as well as recording and playing back of said first, second, and third means for recording and playing back video data, said controlling means further includes the steps of;

selecting one of four operation modes according to the recorded data amount and the playback data amount in said first and second recording & playback means, when video data is recorded, and in said first operation mode, controlling so that reading video data from said first memory means and recording by said first recording & playback means are repeated each time first specified data amount is reached, while recording and playback operations of said second and third recording & playback means are stopped, and in said second operation mode, controlling so that reading of video data from said first memory means and recording by said second recording & playback means are repeated each time said first specified data amount is reached, and storing video data read from said first recording & playback means in said second memory means temporarily, thereafter reading said video data from said second memory means at a specified transfer rate while enabling said third recording & playback means to record transferred data continuously on a magnetic tape by forming tracks obliquely on said magnetic tape, and in said third operation mode, controlling so that reading of video data from said first memory means and recording by said second recording & playback means are repeated each time said first data amount is reached, while recording and playback operations of said first and third recording & playback means are stopped, and in said fourth operation mode, controlling so that reading of video data from said first memory means and recording by said first recording & playback means are repeated each time said first specified data amount is reached, and video data read from said second recording & playback means is stored in said second memory means temporarily, thereafter reading the video data from said second memory means at a specified transfer rate while enabling third recording & playback means to record transferred data on a magnetic tape fed continuously by forming tracks obliquely on said magnetic tape.

* * * * *